(12) United States Patent
Fisunenko et al.

(10) Patent No.: US 10,606,350 B2
(45) Date of Patent: Mar. 31, 2020

(54) DEFORMABLE DISPLAY DEVICE AND IMAGE DISPLAY METHOD USING SAME

(71) Applicant: Samsung Electronics Co., Ltd., Suwon-si, Gyeonggi-do (KR)

(72) Inventors: Andriy Fisunenko, Kiyv (UA); Yevhenii Yakishyn, Kiyv (UA); Mykola Alieksieiev, Kiyv (UA)

(73) Assignee: Samsung Electronics Co., Ltd., Suwon-si (KR)

(*) Notice: Subject to any disclaimer, the term of this patent is extended or adjusted under 35 U.S.C. 154(b) by 23 days.

(21) Appl. No.: 16/063,867

(22) PCT Filed: Oct. 10, 2016

(86) PCT No.: PCT/KR2016/011327
§ 371 (c)(1),
(2) Date: Jun. 19, 2018

(87) PCT Pub. No.: WO2017/111268
PCT Pub. Date: Jun. 29, 2017

(65) Prior Publication Data
US 2018/0373329 A1 Dec. 27, 2018

(30) Foreign Application Priority Data
Dec. 24, 2015 (KR) .................. 10-2015-0186772

(51) Int. Cl.
*G06F 3/01* (2006.01)
*G09F 27/00* (2006.01)
(Continued)

(52) U.S. Cl.
CPC .............. *G06F 3/013* (2013.01); *G06F 3/017* (2013.01); *G06F 3/0481* (2013.01); *G09F 9/301* (2013.01);
(Continued)

(58) Field of Classification Search
CPC .......... G06F 3/013; G06F 3/017; G06F 3/011; G09F 9/301; G09F 19/12; G09F 27/005
See application file for complete search history.

(56) References Cited

U.S. PATENT DOCUMENTS 6,906,860 B2    6/2005    Starkweather
8,878,846 B1    11/2014   Francis, Jr. et al.
(Continued)

FOREIGN PATENT DOCUMENTS

CN    201937647 U    8/2011
CN    103167298 A    6/2013
(Continued)

OTHER PUBLICATIONS

European Search Report dated Dec. 6, 2018 issued in European Patent Application No. 16879136.6.

*Primary Examiner* — Kevin M Nguyen
(74) *Attorney, Agent, or Firm* — Jefferson IP Law, LLP

(57) ABSTRACT

Provided are a deformable display device for displaying an image and a method of displaying an image. The method includes determining a current shape of the display device, capturing an image of a user of the display device, detecting a relative position of the user with respect to the display device, based on the captured image of the user, determining a visible region among an entire screen region of the display device, based on the determined current shape and the detected position, and displaying the image on the determined visible region.

18 Claims, 37 Drawing Sheets

(51) Int. Cl.
*G09F 19/12* (2006.01)
*G09F 9/30* (2006.01)
*G06F 3/0481* (2013.01)
*G06F 1/16* (2006.01)
*G06F 1/3234* (2019.01)
*G06F 1/3287* (2019.01)

(52) U.S. Cl.
CPC ............ *G09F 19/12* (2013.01); *G09F 27/005* (2013.01); *G06F 1/1652* (2013.01); *G06F 1/3265* (2013.01); *G06F 1/3287* (2013.01); *G06F 3/011* (2013.01); *G06F 2203/04102* (2013.01)

(56) References Cited

U.S. PATENT DOCUMENTS

| | | | |
|---|---|---|---|
| 2012/0200495 A1 | 8/2012 | Johansson | |
| 2012/0300061 A1 | 11/2012 | Osman et al. | |
| 2012/0306910 A1* | 12/2012 | Kim | G06F 3/04815 345/619 |
| 2013/0222271 A1 | 8/2013 | Alberth et al. | |
| 2014/0152553 A1 | 6/2014 | Cha et al. | |
| 2014/0191948 A1 | 7/2014 | Kim et al. | |
| 2015/0185832 A1 | 7/2015 | Locker et al. | |
| 2016/0372083 A1* | 12/2016 | Taite | G09G 5/14 |

FOREIGN PATENT DOCUMENTS

| | | |
|---|---|---|
| EP | 2500894 A1 | 9/2012 |
| EP | 2 685 313 A1 | 1/2014 |
| WO | 2006/073287 A1 | 7/2006 |
| WO | 2013/112237 A1 | 8/2013 |
| WO | 2014/007958 A1 | 1/2014 |

\* cited by examiner

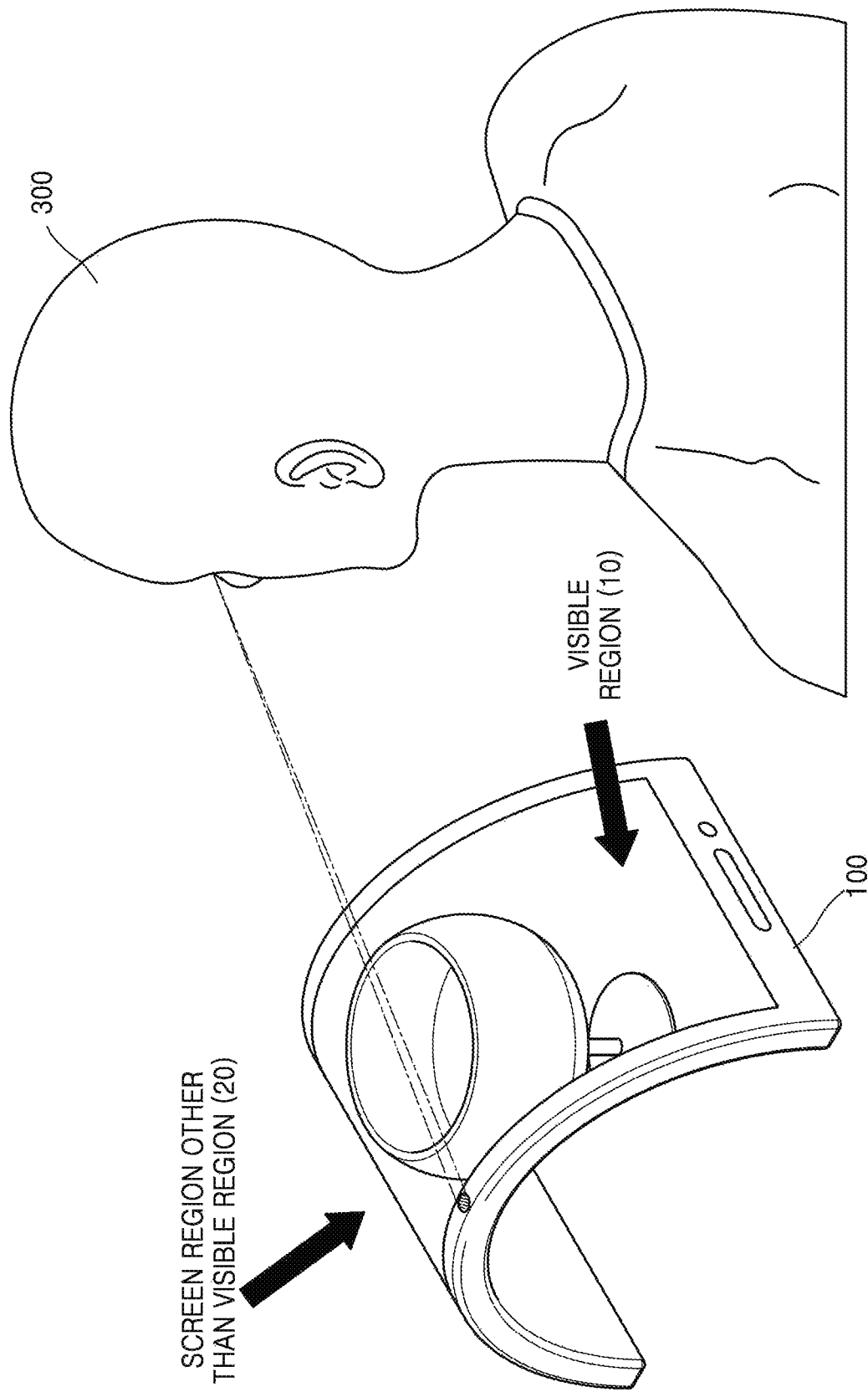

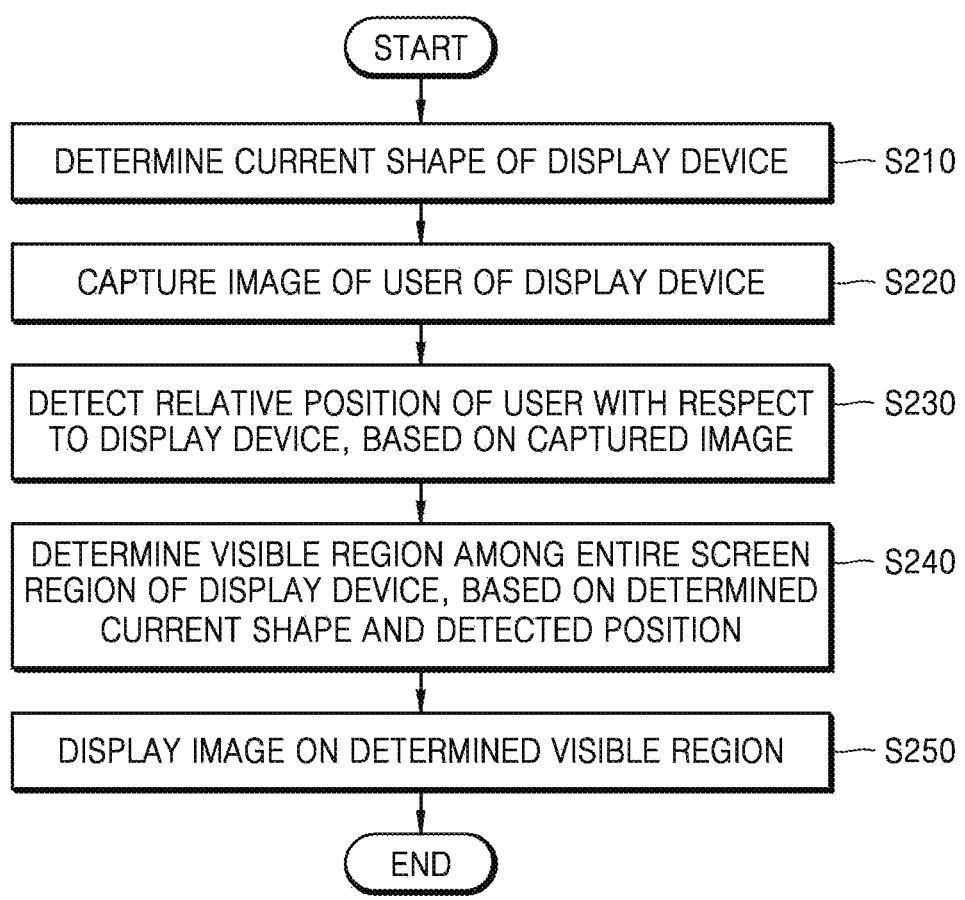

DEFORMABLE DISPLAY DEVICE AND IMAGE DISPLAY METHOD USING SAME

TECHNICAL FIELD

The present disclosure relates to a deformable display device and an image display method using the same, and more particularly, to a device and a method for providing a three-dimensional (3D) image according to the current state of a display device and the position of a user.

BACKGROUND ART

As the hardware and software of display devices develop, display devices may execute various applications together and process a variety of information. Also, as flexible display devices develop, there is demand for efficient execution of an application according to the deformed state of a flexible display device. Particularly, in the case of displaying an image on a display device, there is demand for technology for efficiently displaying the image according to the deformed state of the display device.

In addition, in the case of displaying a three-dimensional (3D) image on a display device according to the related art, the 3D image is displayed regardless of the distance between the display device and a user. Thus, the user is inconvenienced by having to personally set the distance to the display device for effective 3D image viewing.

As related art, Korean Patent Publication No. 2014-0105922 discloses a stereoscopic display method for displaying a 3D image according to an event. However, the above related art has a limitation in that it may not provide an effective image based on the deformed state of the display device or the relative positions of the user and the display device.

DESCRIPTION OF EMBODIMENTS

Technical Problem

According to an embodiment, provided are a deformable display device and an image display method using the same, which may effectively display an image based on the current shape of the display device and the relative positions of a user and the display device.

Solution to Problem

According to an aspect of the present disclosure, a method, performed by a deformable display device, of displaying an image includes: determining a current shape of the display device; capturing an image of a user of the display device; detecting a relative position of the user with respect to the display device based on the captured image of the user; determining a visible region among an entire screen region of the display device based on the determined current shape and the detected position; and displaying the image on the determined visible region.

Herein, the image may be a three-dimensional (3D) image, and the method may further include rendering the 3D image according to an attribute of the visible region.

Also, the attribute of the visible region may include at least one of a size of the visible region, a position of the visible region, and a shape of the visible region.

Also, the method may further include deactivating a region other than the visible region among the entire screen region.

Also, the method may further include changing a color of a background screen displayed in the visible region among the entire screen region.

Also, the capturing of the image of the user of the display device may include capturing an image of at least a portion of a body of the user, the portion including a pupil of the user, the detecting of the relative position of the user may include determining an eye position of the user, based on an image including the pupil of the user, and the determining of the visible region may include determining the visible region based on the eye position of the user.

Also, the method may further include: changing the visible region as the eye position of the user changes; and displaying the image on the changed visible region.

Also, the method may further include rendering an image to be displayed, based on an attribute of the changed visible region.

Also, the determining of the visible region may include determining the visible region based on at least one of the eye position of the user, a distance between the display device and the user, a gesture of the user included in the image, and an eye direction of the user.

Also, the method may further include stopping changing the visible region when the eye direction of the user deviates from the screen.

Herein, the display device may include a plurality of cameras, and the capturing of the image of the user may include activating at least one of the plurality of cameras based on the determined current shape of the display device.

Also, the method may further include: sensing that the shape of the display device is deformed; changing the visible region based on the deformed shape as the shape of the display device is deformed; and displaying the image on the changed visible region.

Also, the display device may include a plurality of screens, at least one of the plurality of screens may be selected according to the current shape of the display device, and the visible region may be determined among an entire region of the selected at least one screen.

Also, the method may further include: capturing an image of another user of the display device; detecting a relative position of the other user with respect to the display device based on the captured image of the other user; determining another visible region among the entire screen region of the display device based on the determined shape and the detected position of the other user; and displaying the image on the determined other visible region.

Also, the other visible region may not overlap a set visible region among the entire screen region of the display device.

Also, the image displayed on the other visible region may be different from the image displayed on the visible region.

According to another aspect of the present disclosure, a computer-readable recording medium has recorded thereon a program that, when executed by a computer, performs any one of the above methods.

According to another aspect of the present disclosure, a deformable display device for displaying an image includes: a sensor configured to capture an image of a user of the display device; a controller configured to determine a current shape of the display device, detect a relative position of the user with respect to the display device based on the captured image of the user, and determine a visible region among an entire screen region of the display device based on the determined current shape and the detected position; and a display unit configured to display the image on the determined visible region.

Herein, the image may be a 3D image, and the controller may render the 3D image according to an attribute of the visible region.

Also, the attribute of the visible region may include at least one of a size of the visible region, a position of the visible region, and a shape of the visible region.

Herein, the controller may deactivate a region other than the visible region among the entire screen region.

Also, the controller may change a color of a background screen displayed in the visible region among the entire screen region.

Also, the sensor may capture an image of at least a portion of a body of the user including a pupil of the user, and the controller may determine an eye position of the user based on an image including the pupil of the user and determine the visible region based on the eye position of the user.

Also, the controller may change the visible region as the eye position of the user changes, and the display unit may display the image on the changed visible region.

Also, the controller may render an image to be displayed, based on an attribute of the changed visible region.

Also, the controller may determine the visible region based on at least one of the eye position of the user, a distance between the display device and the user, a gesture of the user included in the image, and an eye direction of the user.

Also, the controller may stop changing the visible region when the eye direction of the user deviates from the screen.

Also, the sensor may include a plurality of cameras, and the controller may activate at least one of the plurality of cameras based on the determined current shape of the display device.

Also, as the shape of the display device is deformed, the controller may change the visible region based on the deformed shape, and the display unit may display the image on the changed visible region.

Herein, the display unit may include a plurality of screens, the controller may select at least one of the plurality of screens according to the current shape of the display device, and the visible region may be determined among an entire region of the selected at least one screen.

Also, the sensor may capture an image of another user of the display device, the controller may detect a relative position of the other user with respect to the display device based on the captured image of the other user and determine another visible region among the entire screen region of the display device based on the determined shape and the detected position of the other user, and the display unit may display an image on the determined other visible region.

Herein, the other visible region may not overlap a set visible region among the entire screen region of the display device.

Also, the image displayed on the other visible region may be different from the image displayed on the visible region.

Advantageous Effects of Disclosure

According to an embodiment, an optimized three-dimensional (3D) image may be provided for a screen set as a visible region according to the shape of the display device and the position of the user.

According to an embodiment, the power of the display device may be saved and the energy may be efficiently used by deactivating a screen determined as a screen region other than a visible region according to the shape of the display device and the position of the user.

According to an embodiment, the display device may be used in various fields by efficiently displaying a 3D image through the display device including a plurality of screens.

According to an embodiment, the utilization of an application requiring a stereoscopic image may be increased.

BRIEF DESCRIPTION OF DRAWINGS

FIG. 1 is a diagram illustrating a deformable display device for displaying an image according to the position of a user, according to an embodiment.

FIG. 2 is a flowchart illustrating a display method using a display device, according to an embodiment.

MODE OF DISCLOSURE

Figure 3A:
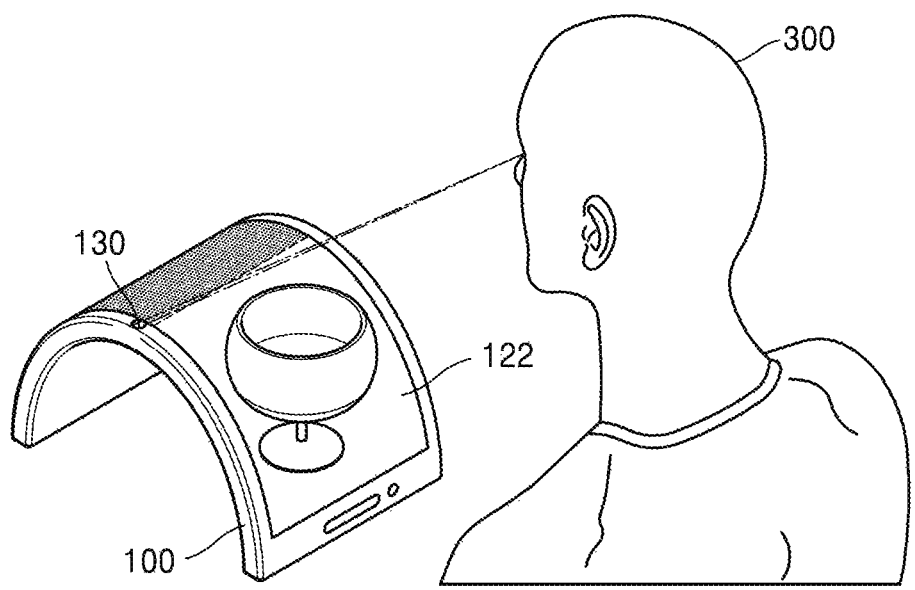
FIGS. 3A and 3B are diagrams illustrating a display device for displaying an image according to the current shape of the display device, according to an embodiment.

Hereinafter, embodiments of the present disclosure will be described in detail with reference to the accompanying drawings so that those of ordinary skill in the art may easily implement the embodiments. However, the present disclosure may be embodied in various different forms and should not be construed as being limited to the embodiments described herein. In addition, portions irrelevant to the description of the present disclosure will be omitted in the drawings for a clear description of the present disclosure, and like reference numerals will denote like elements throughout the specification.

Throughout the specification, when an element is referred to as being "connected" to another element, it may be "directly connected" to the other element or may be "electrically connected" to the other element with one or more intervening elements therebetween. Also, when something is referred to as "including" a component, another component may be further included unless specified otherwise.

Also, herein, a display device may be a deformable display device capable of being deformed and may include, for example, a flexible device, a folding device, or the like. The flexible device may be a display device displaying a user interface on a screen by using a bendable or flexible display substrate and may use, for example, a foldable or rollable display substrate.

Throughout the present embodiments, a "folding motion (operation)" or a "bending motion (operation)" may refer to a motion (operation) in which a flexible device or a flexible display is folded or bent. On the other hand, throughout the present embodiments, an "unfolding motion (operation)" or an "unbending motion (operation)" may refer to a motion (operation) in which a flexible device or a flexible display is unfolded or unbent. More detailed definitions thereof will be described below with reference to FIG. 1.

Particularly, throughout the present embodiments, "deforming" may refer to a state in which the external shape of a flexible device is changed, such as "folding" or "bending". Thus, throughout the present embodiments, the term "deforming" may be alternatively interpreted as the term "folding", "unfolding", "bending (or flexing)", "unbending (or unflexing)", or the like.

According to an embodiment, a "display device" may be a display device according to an embodiment and may refer to a deformable display device having at least one screen and capable of being deformed. Hereinafter, all of "deformable display device", "flexible display device", "folder-type (or folding or foldable) display device", "multiscreen display device", "segmented display device", "edge-type display device", and other display devices may be interchangeably used as "display device 100" according to an embodiment.

Hereinafter, the present disclosure will be described in detail with reference to the accompanying drawings.

FIG. 1 is a diagram illustrating a deformable display device for displaying an image according to the position of a user, according to an embodiment.

As illustrated in FIG. 1, a display device 100 according to an embodiment may be a deformable display device.

The display device 100 may be a mobile device; however, this is merely an example and the display device 100 may be implemented as an electronic device including a display. For example, the display device 100 may be implemented as various electronic devices such as televisions (TVs), tablet personal computers (PCs), digital cameras, camcorders, notebook computers (laptop computers), desktops, e-book terminals, digital broadcast terminals, personal digital assistants (PDAs), portable multimedia players (PMPs), navigation devices, MP3 players, and wearable devices. Also, the display device 100 may be stationary or mobile.

In FIG. 1, as an embodiment, a flexible display device will be described as an example of the deformable display device 100.

The output resolution of the display device 100 may include, for example, High Definition (HD), Full HD, Ultra HD, or resolution higher than Ultra HD.

The display device 100 illustrated in FIG. 1 may be bent convexly toward a user 300. That is, a screen exposed outside from a display substrate may be bent convexly toward the user 300.

For example, a piezoelectric sensor or an optical sensor may be located at the edge of the display substrate, and the display device 100 may use the piezoelectric sensor or the optical sensor to determine whether the display device 100 is deformed into any shape and to determine the current shape of the display device 100.

Also, the deformation degree of the display substrate may be continuously changed in the display device 100, and in this case, a controller 110 may sense a change in the current shape of the display device 100 in real time.

In an embodiment, the term "user" may refer to a person controlling a function or operation of an image by using the display device 100 and may include a viewer, a manager, or an installer.

The display device 100 may sense the user 300 to detect the position of the user 300 with respect to the display device 100.

The display device 100 may detect the relative position of the user 300 based on the image of the sensed user 300.

The display device 100 may determine a visible region 10 among the entire screen region of the display device 100 based on the current shape of the display device 100 and the relative position of the user 300.

Herein, the "visible region" may refer to a screen region determined as a screen region that may be recognized by the user 300 among the entire screen region of the display device 100. For example, as illustrated in FIG. 1, when the screen of the display device 100 is bent convexly toward the user 300, the user 300 may not recognize a region of the entire screen region that does not face the user 300. That is, the user 300 may recognize only the screen that is viewed toward the user 300, and a region visible to the user 300 among the entire screen region may be determined as the visible region 10.

The visible region 10 may be determined according to the current shape of the display device 100 and the relative position of the user 300 with respect to the display device 100. Also, the visible region 10 may be changed according to the current shape of the display device 100 and the relative position of the user 300 with respect to the display device 100.

The display device 100 may display an image on the determined visible region 10. That is, the display device 100 may control the display of an image only on the visible region 10 among the entire screen region included in a display unit.

According to an embodiment, the display device 100 may deactivate a screen region other than the visible region 10 among the entire screen region. Herein, "deactivation" may represent, for example, interruption of power supply to a screen region other than the visible region 10 among the entire screen region, not displaying an image, or changing the background color of the screen.

Herein, the image displayed on the visible region 10 may be a three-dimensional (3D) image. The controller 110 may render an image to be displayed, according to the attribute of the visible region 10.

Herein, "rendering" may refer to a process of generating a 3D image by injecting reality into a two-dimensional (2D) image by considering external information such as light source, position, and color, and may refer to a computer graphics process for adding reality by providing stereoscopic effect by applying shadows or density changes to a planar object.

For example, a rendering method may be a wireframe rendering method for drawing only the edges of an object. The most commonly used rendering method may be a raytracing rendering method, and the raytracing rendering method may be a rendering method for determining the color of each pixel through a process of calculating the refraction and reflection of a ray and back-tracing the path to the illumination where the ray has started.

According to an embodiment, the display device 100 may control the display of a rendered 3D image on the screen of a display unit 120, that is, on the visible region 10.

FIG. 2 is a flowchart illustrating a display method using a display device, according to an embodiment.

As illustrated in FIG. 2, the display device 100 according to an embodiment may display an image on the screen determined based on the current shape of the display device 100 and the relative position of the user 300.

In operation S210, the display device 100 may determine the current shape of the display device 100. The current shape of the display device 100 may refer to the current shape of the deformable display device 100. For example, the current shape of the display device 100 may include the bent degree and the bent direction of the display device 100, the folding state of the display device 100, the shape and the folding angle of a plurality of screens included in the display device 100, and the placed state of a display device including a polyhedron.

In operation S220, the display device 100 may capture an image of the user 300 of the display device 100. According to an embodiment, a sensor may capture the image of the user 300 of the display device 100. According to an embodiment, the sensor may refer to a camera included in the display device 100.

The display device 100 may include a plurality of cameras. In operation S220, at least one of the plurality of cameras may be activated based on the current state of the display device 100. For example, when a camera is included in each of the front side and the rear side of the display device 100, only the camera on the side where the user 300 is located may be activated.

In operation S230, the display device 100 may detect the relative position of the user 300 with respect to the display device 100 based on the captured image. That is, the display device 100 may infer the relative position of the user 300 with respect to the display device 100, according to the position of a user image in the captured image.

In operation S240, the display device 100 may determine a visible region among the entire screen region of the display device 100 based on the determined current shape of the display device 100 and the relative position of the user 300 with respect to the display device 100.

The display device 100 may determine a screen on which an image is to be displayed according to the current shape of the display device 100. Also, a screen region that may be recognized by the user 300, that is, a visible region, may be determined according to the relative position of the user 300. That is, the display device 100 may determine a screen in a state in which an image is to be displayed, according to the current shape of the display device 100, and may also determine a screen region in which an image may be displayed, according to the relative position of the user 300.

In operation S250, the display device 100 may display an image on the determined visible region 10. That is, the controller 110 may display an image only on the visible region determined according to the current state of the display device 100 and the relative position of the user 300. Accordingly, the display device 100 may optimize the energy consumed to display the image.

Figure 3B:
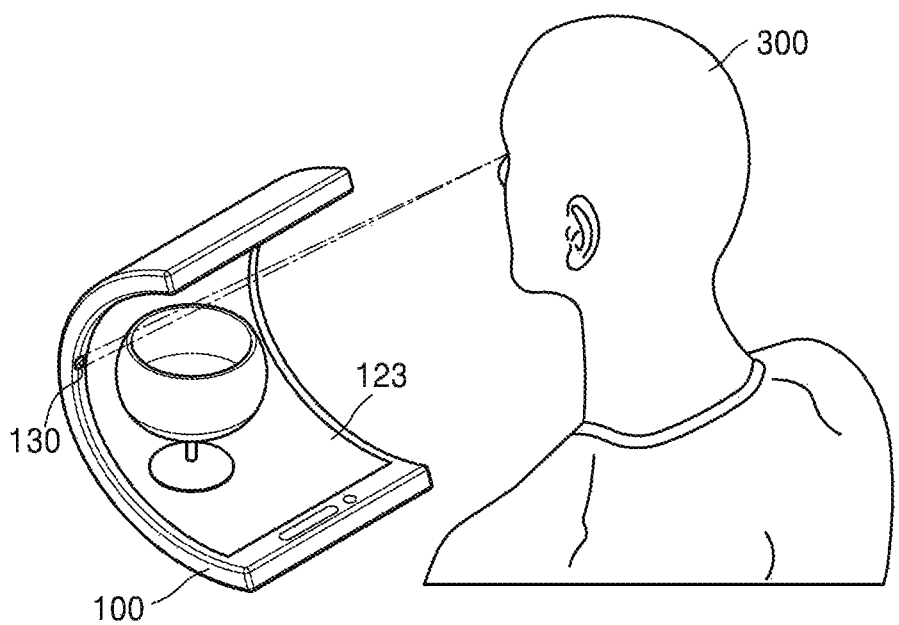

FIGS. 3A and 3B are diagrams illustrating an example in which a display device displays an image according to the current shape of the display device, according to an embodiment.

As illustrated in FIGS. 3A and 3B, according to an embodiment, a visible region used by the display device 100 to display an image may be changed based on a change in the shape of the display device 100.

FIG. 3A is a diagram illustrating a case where the display device 100 is bent convexly toward the user 300. That is, a screen exposed outside from a display substrate may be bent convexly toward the user 300.

As illustrated in FIG. 3A, a sensor implemented as a camera may capture an image of the user 300. The display device 100 may detect the position of the user 300 based on the captured image of the user 300.

Also, the display device 100 may determine a visible region based on the current shape of the display device 100 and the position of the user 300. In FIG. 3A, the display device 100 may determine, as the visible region, a screen region 122 that is viewed toward the user 300 to the user 300 among the entire screen region.

The display device 100 may render a 3D image to be displayed on the screen region 122 determined as the visible region. Also, the controller 110 may display the rendered 3D image on the visible region.

Also, the display device 100 may change the screen color of the remainder screen region other than the screen region determined as the visible region. Accordingly, the user 300 may recognize attributes such as the shape, position, and size of the screen determined as the visible region among the entire screen region.

FIG. 3B is a diagram illustrating a case where the display device 100 is bent concavely toward the user 300. For example, both ends of the display device 100 may face the user 300 and the screen viewed by the user 300 may be bent concavely.

As illustrated in FIG. 3B, a sensor 130 implemented as a camera may capture an image of the user 300. The display device 100 may detect the position of the user 300 based on the captured image of the user 300.

Also, the display device 100 may determine a visible region based on the current shape of the display device 100 and the position of the user 300. In FIG. 3B, the display device 100 may determine, as the visible region, an entire screen region 123 that is viewed toward the user 300 to the user 300. In an example illustrated in FIG. 3B, since the entire screen region 123 is determined as the visible region, there may be no region having a different background color as a screen region other than the visible region.

The display device 100 may render a 3D image to be displayed on the visible region. Also, the display device 100 may display the rendered 3D image on the visible region 123.

According to an embodiment, the size of the visible region determined in FIG. 3B may be greater than the size of the visible region determined in FIG. 3A. Accordingly, the attribute of the rendered 3D image may be different according to the size of the visible region. Herein, the attribute of the 3D image may include, for example, the size of an image file, the number of pixels consumed, and the number of polygons used.

Figure 4:
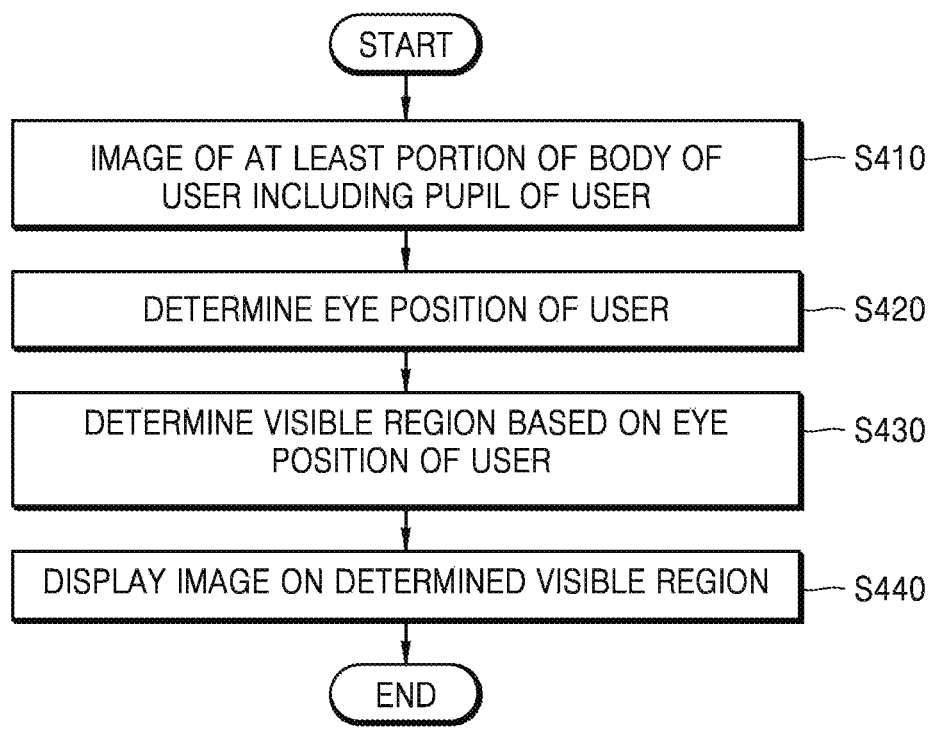
FIG. 4 is a flowchart illustrating a method of determining a visible region according to the position of a user, according to an embodiment.

FIG. 4 is a flowchart illustrating a method of determining a visible region according to the position of a user, according to an embodiment.

According to an embodiment illustrated in FIG. 4, a visible region among the entire screen region may be determined according to an eye position of the user 300.

Herein, the "eye position" may refer to the position of the eye of the user on the screen.

In operation S410, the display device 100 may capture an image of at least a portion of the body of the user 300 including the pupil of the user 300. The pupil of the user 300 may be used as a reference point for determining the direction of the display screen viewed by the user 300. The display device 100 may capture the image including the user 300 in real time.

In operation S420, the display device 100 may determine the eye position of the user 300 from the captured image of the user 300. The display device 100 may determine which portion of the display device 100 the user is looking at, by analyzing the direction of the user's pupil in the captured image and the position of the user in the captured image. The eye position may be a position on the screen where the eye of the user 300 having a relative position with respect to the display device 100 is located.

In operation S430, the display device 100 may determine a visible region based on the eye position of the user 300. The display device 100 may determine the visible region as a recognition target region of the user 300 among the entire screen region with respect to the eye position of the user 300. Also, the display device 100 may determine a visible region based on the current shape of the display device 100 with respect to the eye position of the user 300.

The visible region may be determined based on the current shape of the display device 100 and may vary according to the attribute of the screen included in the display device 100. Herein, the attribute of the screen may include, for example, the arranged shape of the screen in the display device 100, the external shape of the display device 100, the number of screens, the size of the screen, and the shape of the screen. However, the present disclosure is not limited thereto.

In operation S440, the display device 100 may control the display of an image on the determined visible region.

The display device 100 may render a 3D image according to the attribute of the visible region. The display device 100 may determine the number of polygons for rendering the 3D image according to the attribute of the visible region. The display device 100 may efficiently use a processor by rendering an image displayed only in the visible region among the entire screen region. Also, the display device 100 may generate an optimized effect within the performance of the hardware.

The polygon may refer to a polygon that is a basic unit used to represent an object in 3D graphics. In the 3D graphics, polygons may be collected to represent various 3D objects. That is, the 3D object may refer to an aggregate of polygons. Since the number of polygons that may be rendered in real time by the display device 100 may be limited, the processing speed of the processor may decrease when an object having a large number of polygons is displayed on the screen. Thus, it may be important to adjust the number of polygons within the range that does not exceed the performance of the hardware of the display device 100.

The display device 100 may display the rendered 3D image on the visible region by using the polygons determined suitably based on the attribute of the visible region.

Figure 5A:
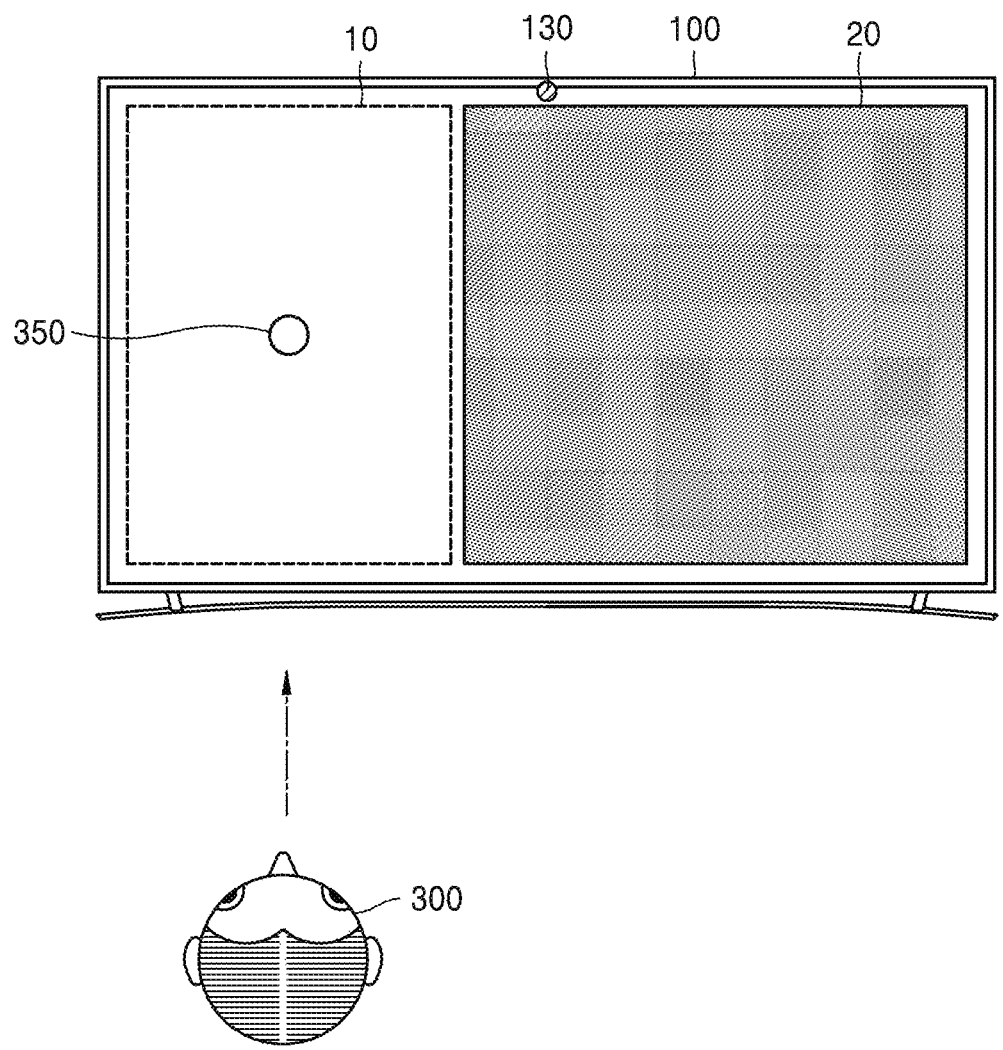
FIGS. 5A and 5B are diagrams illustrating an example of determining a visible region based on the eye position of a user, according to an embodiment.
Figure 5B:
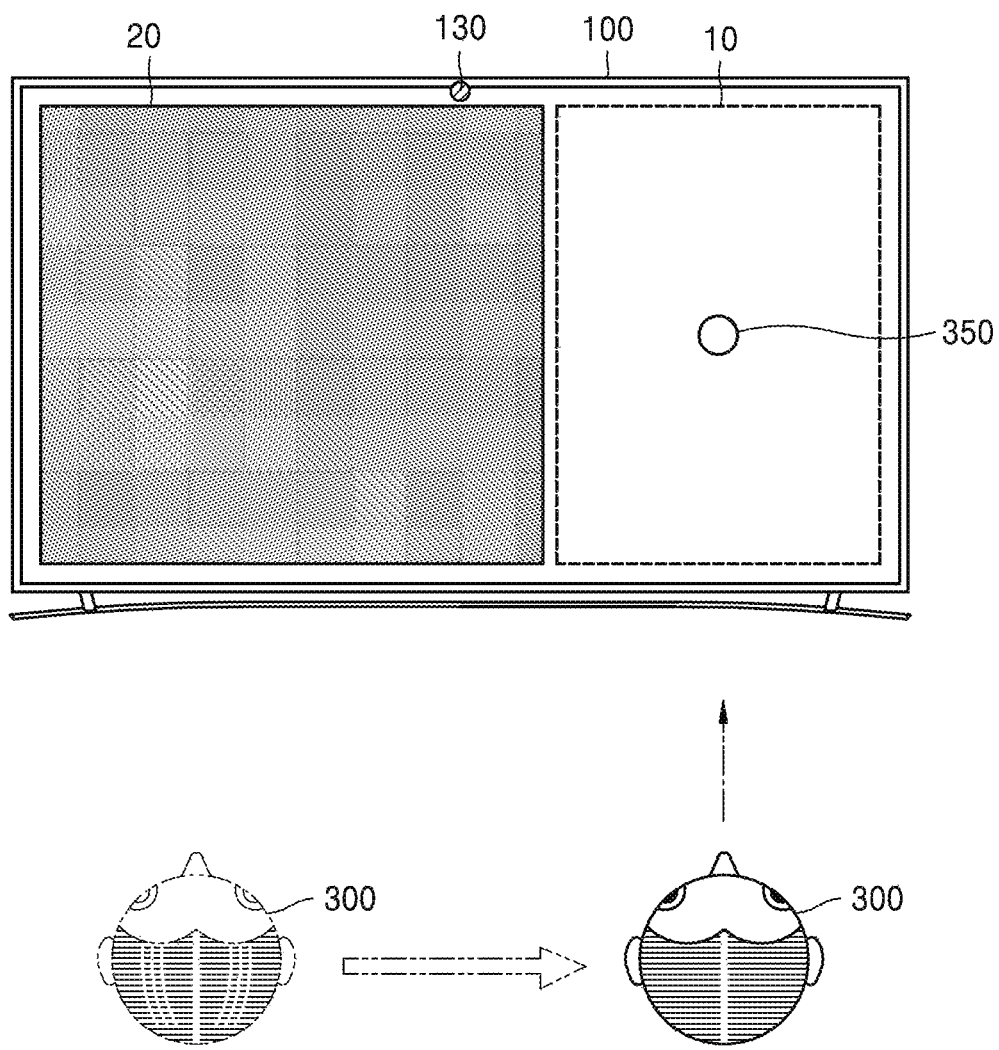

FIGS. 5A and 5B are diagrams illustrating an example of determining a visible region based on the eye position of a user, according to an embodiment.

Referring to FIG. 5A, the deformable display device 100 may determine a visible region 10 based on an eye position 350 of the user 300.

For convenience of description, the display device 100 of FIG. 5A may be a display unit of a planar screen.

The display device 100 may capture an image of the user 300. More particularly, the display device 100 may capture an image of at least a portion of the body of the user 300 including the pupil of the user 300.

The display device 100 may determine the eye position 350 of the user 300 on the screen by recognizing the pupil of the user 300 from the captured image. Herein, the screen where the eye position 350 is determined may include the entire screen region. Alternatively, the screen where the eye position 350 is determined may include a screen region activated according to the current shape of the display device 100.

The display device 100 may set the visible region 10 among the entire screen region of the display device 100 with respect to the eye position 350 of the user 300. According to an embodiment, the visible region 10 in FIG. 5A may have a rectangular shape equal to the shape of the screen. In FIG. 5A, the visible region 10 may include an attribute determined based on the eye position 350 and the current shape of the display device 100. Herein, the attribute may include the size and shape of the visible region 10, the position in the screen region, and the like.

The display device 100 may deactivate a remainder screen region 20 other than the visible region among the entire screen region. Herein, the deactivation may represent the interruption of power supplied to the remainder screen region 20 other than the visible region among the entire screen region, or the change of the remainder screen region 20 into a power saving mode for system optimization.

The display device 100 may change the color of the remainder screen region 20 other than the visible region 10 among the entire screen region as the visible region 10 is determined. For example, the two regions may be distinguished by changing the background color of the visible region 10 into green and the background color of the remainder screen region 20 into black.

FIG. 5B is a diagram illustrating an example of determining a visible region based on a changed eye position as the user 300 moves, according to an embodiment.

Referring to FIG. 5B, the display device 100 may change the eye position 350 on the screen in real time based on the movement of the user 300 sensed by the display device 100. The display device 100 may sense the movement of the user 300 in real time.

The display device 100 may set the visible region 10 among the entire screen region of the display device 100 with respect to the changed eye position 350 of the user 300. That is, the display device 100 may reset the visible region 10 according to the changed eye position 350 of the user 300.

The display device 100 may control the display of the visible region 10 and the remainder region 20 in different colors in order to distinguish the reset visible region 10 and the remainder region 20 outside the visible region.

The display device 100 may render an image displayed on the reset visible region 10. The display device 100 may render a 3D image according to the attribute of the reset visible region 10. For example, when the previous visible region and the reset visible region 10 have different attributes, the 3D image may be rendered according to the attribute of the reset visible region 10.

According to an embodiment, by setting the visible region 10 according to the changed position of the user 300, the display device 100 may display an optimized 3D image according to the system state.

Also, the display device 100 may determine a visible region based on at least one of the eye position of the user 300, the distance between the display device 100 and the user 300, the gesture of the user 300 included in the image, and the eye direction of the user 300.

The gesture of the user 300 may be sensed through an optical receiver or a camera of the sensor 130. The display device 100 may enlarge, reduce, or change the visible region based on the gesture of the user 300.

The eye direction of the user 300 may be sensed from the image of the pupil of the user 300. The display device 100 may sense the pupil of the user 300 as the eye of the user 300 and detect the eye direction of the user 300 through the angle formed by the screen and the eye of the user 300. Also, the display device 100 may determine a visible region based on the eye direction of the user 300.

Hereinafter, an embodiment of determining a visible region according to the distance between the display device 100 and the user 300 will be described with reference to FIG. 6.

Figure 6:
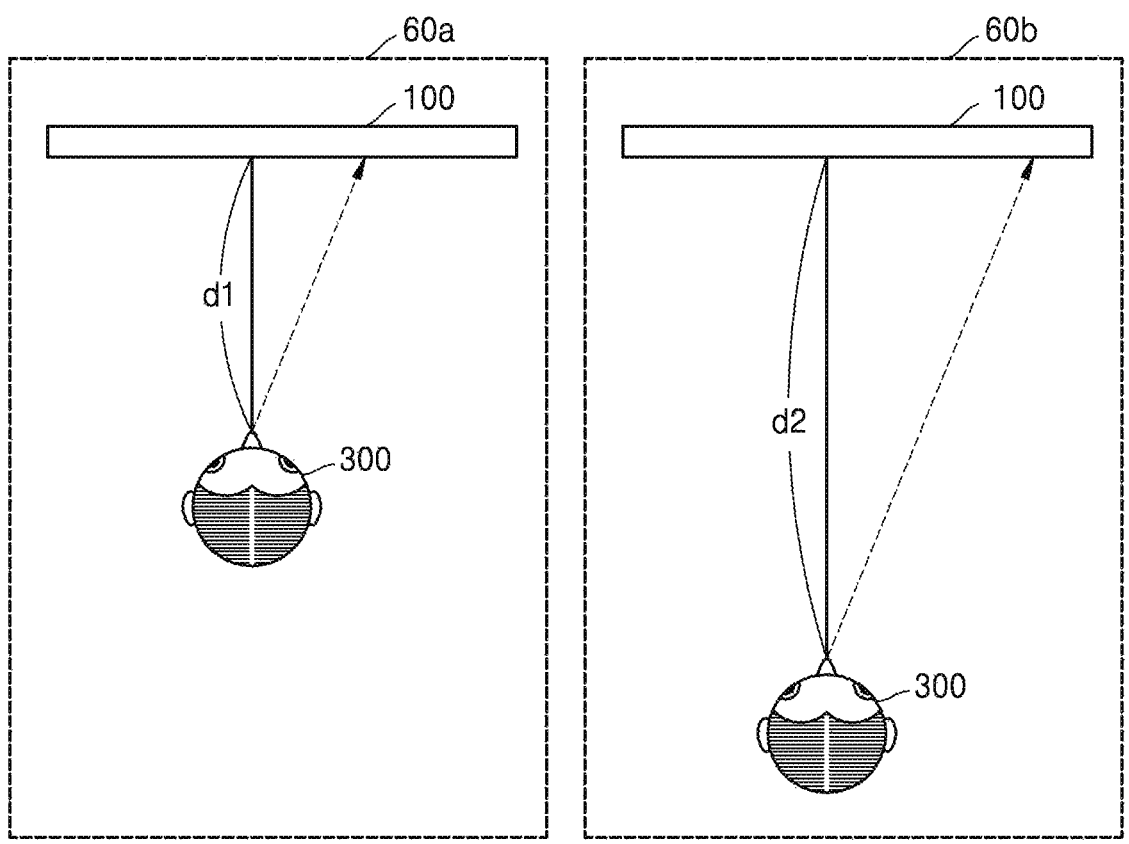
FIG. 6 is a diagram illustrating an example of determining a visible region by considering the position of a user with respect to a display device, according to an embodiment.

FIG. 6 is a diagram illustrating an example of determining a visible region by considering the position of a user with respect to a display device, according to an embodiment.

Referring to FIG. 6, in a left diagram 60a and a right diagram 60b, the angle of the eye direction of the user 300 viewing the display device 100 is the same, but the distance from the display device 100 to the user 300 is different as d1 and d2.

As such, even when the angle formed by the eye direction of the user 300 with respect to the display device 100 is the same, the eye position may be determined differently according to the distance between the display device 100 and the user 300. This is because the perspective view varies according to the distance from the display device 100 to the user 300.

Thus, a more realistic 3D screen may be provided by considering not only the angle formed by the eye direction of the user 300 with respect to the display unit 120 of the display device 100 but also the distance from the display device 100 to the user 300 in determining the eye position.

For example, the visible region determined when the user 300 is located at a distance d2 from the display device 100 may be wider than the visible region determined when the user 300 is located at a distance d1 from the display device 100.

Figure 7:
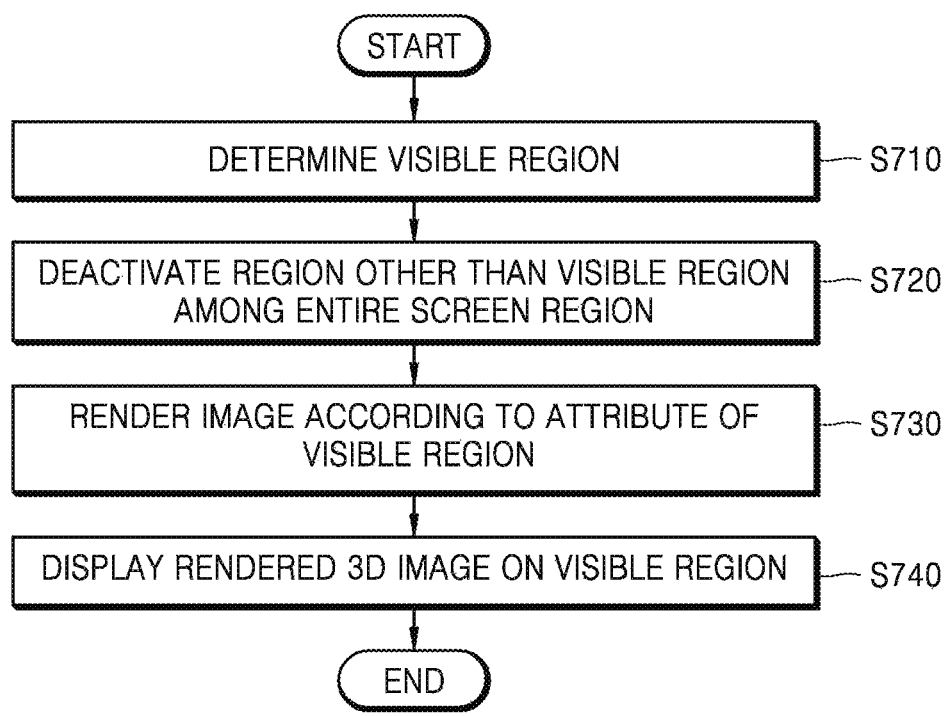
FIG. 7 is a flowchart illustrating a method of rendering an image according to an attribute of a visible region, according to an embodiment.

FIG. 7 is a flowchart illustrating a method of rendering an image according to the attribute of a visible region, according to an embodiment.

In operation S710, the display device 100 may determine a visible region. Particularly, the display device 100 may determine a visible region based on the current shape of the display device 100 and the relative position of the user 300 with respect to the display device 100.

In operation S720, the display device 100 may deactivate a region other than the visible region among the entire screen region. Herein, the deactivation may represent the interruption of power supply to the region other than the visible region among the entire screen region. Alternatively, the deactivation may represent the minimization of a process for the remainder screen region other than the visible region for system optimization and energy saving of the display device 100.

In operation S730, the display device 100 may render an image according to the attribute of the visible region. Herein, the attribute of the visible region may include at least one of the size of the visible region, the shape of the visible region, and the position of the visible region.

The display device 100 may render a 3D image based on the attribute of the visible region. For example, the display device 100 may determine the size of an object to be displayed, the display direction, and the display position, based on the size, shape, and position of the visible region. Also, for example, the display device 100 may determine the number of polygons necessary to implement the object to be displayed, according to the size of the visible region. The display device 100 may render a 3D image by the determined polygon. The display device 100 may optimize the operation environment of the system of the display device 100 by generating a 3D image according to the attribute of the visible region. Also, for example, the display device 100 may determine the display direction of the object to be displayed, based on the relative position and the eye direction of the user 300.

In operation S740, the display device 100 may display the rendered 3D image on the visible region. Accordingly, the 3D image may be displayed only in the screen region set as the visible region among the entire screen region of the display unit 120.

Hereinafter, a flexible display device for the flow of the present disclosure will be described as an embodiment with reference to FIG. 8.

Figure 8:
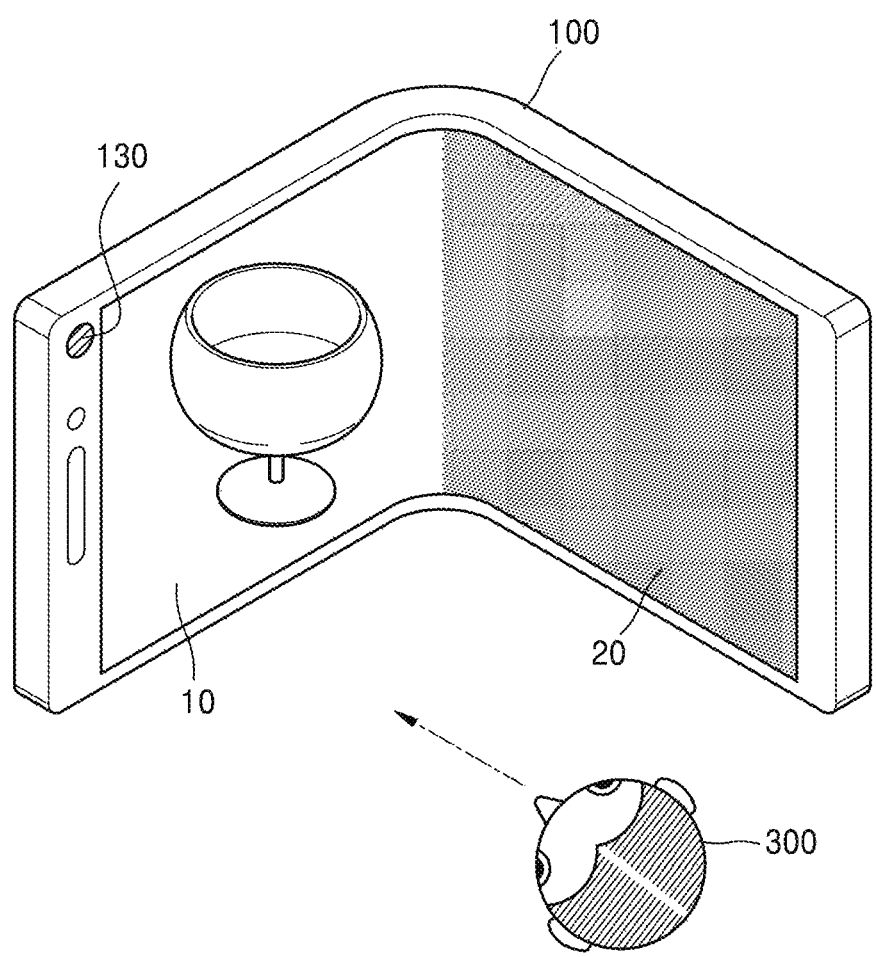
FIG. 8 is a diagram illustrating a display device for displaying a three-dimensional (3D) image, according to an embodiment.

FIG. 8 is a diagram illustrating a display device for displaying a three-dimensional (3D) image, according to an embodiment.

Referring to FIG. 8, the display device 100 may sense the current shape of the flexibly deformable display device 100 and determine the bent shape as the current shape. As illustrated in FIG. 8, the display device 100 may have the shape bent in the shape of an alphabet "L".

The display device 100 may sense the user 300. More particularly, the sensor implemented by the camera may sense the user 300 of the display device 100 by capturing an image of the user 300.

The display device 100 may detect the position of the user 300 based on the captured image. The position of the user 300 may be detected by considering the distance between the user 300 and the display device 100, the eye direction of the user 300, the eye position of the user 300, and the like.

In FIG. 8, the display device 100 may set a partial region of the entire display screen region as the visible region 10 based on the current shape of the display device 100 and the position of the user 300. Also, in order to emphasize the visible region 10, the color of the remainder region 20 other than the visible region 10 among the entire screen region may be changed.

The display device 100 may render a 3D image according to the attribute of the visible region 10. Also, the display device 100 may display the rendered 3D image on the visible region 10. In this case, the energy of the display device 100 may be efficiently used by deactivating the remainder region 20 other than the visible region 10 among the entire screen region.

Figure 9A:
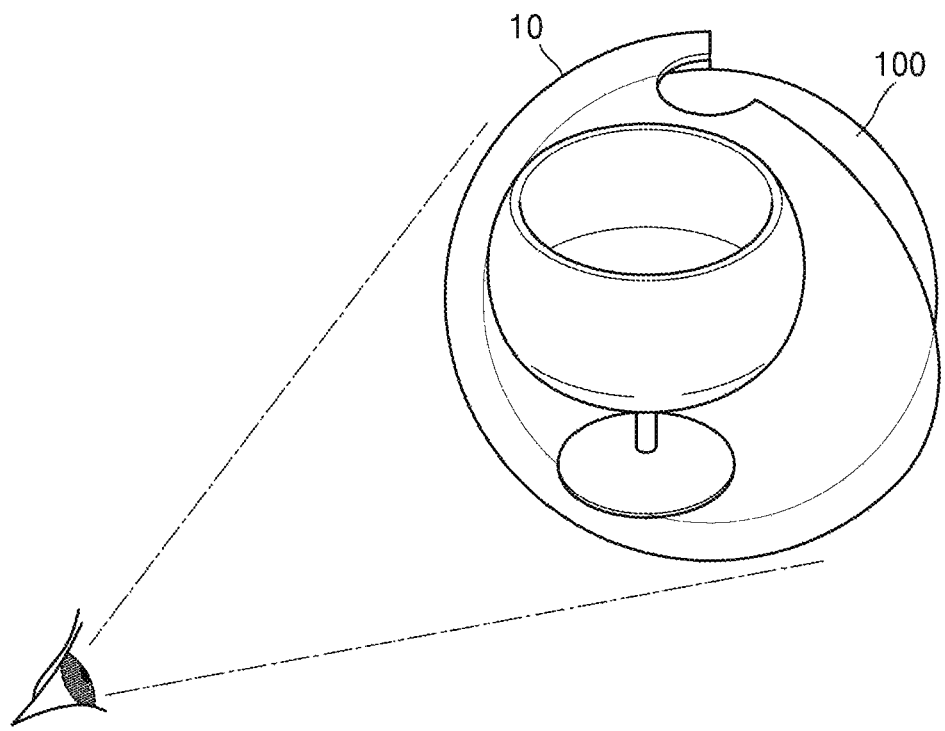
FIGS. 9A and 9B are diagrams illustrating an example of a deformable display device for displaying a 3D image, according to an embodiment.
Figure 9B:
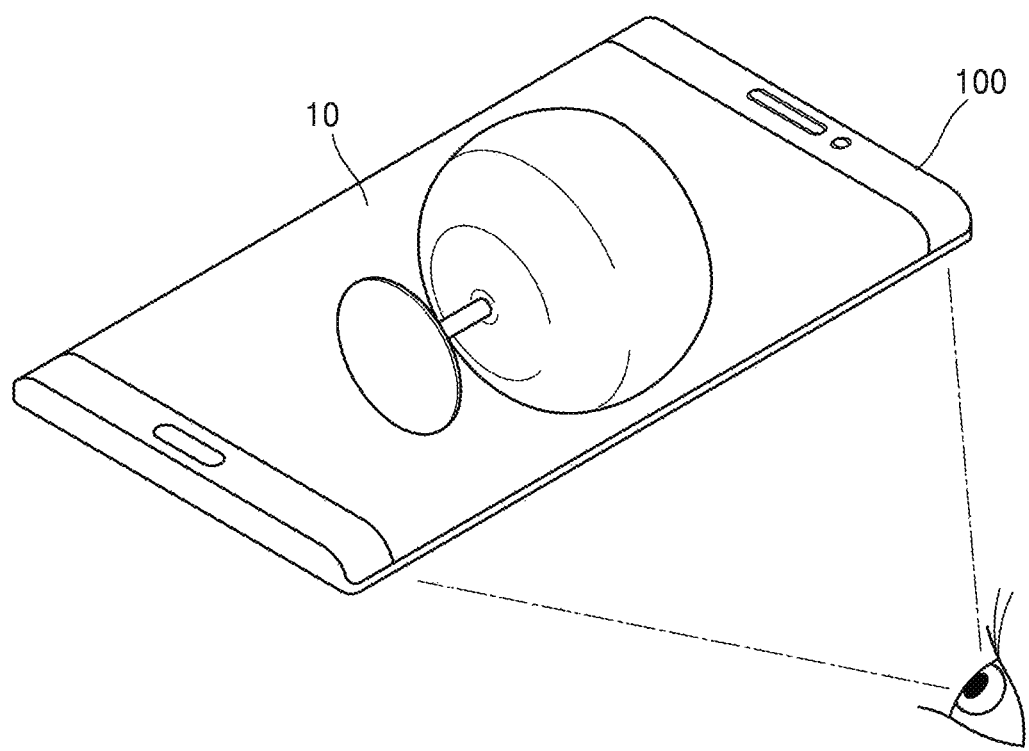

FIGS. 9A and 9B are diagrams illustrating an example of a deformable display device for displaying a 3D image, according to an embodiment.

FIG. 9A illustrates an example of displaying a 3D image on a spherical display device.

The display device 100 according to an embodiment may be a spherical display device 100.

The spherical display device 100 may detect the relative position of the user 300. Also, the visible region 10 may be set based on the spherical shape and the relative position of the user 300. Herein, the spherical display device 100 may include a spherical screen region.

In FIG. 9A, the visible region 10 may be determined in the spherical screen region except the side opposite to the user 300.

The display device 100 may display a 3D image on the visible region 10 determined among the spherical entire screen region.

FIG. 9B illustrates an example of displaying a 3D image on an edge-type display device.

The display device 100 according to an embodiment may be an edge-type display device 100.

The edge-type display device 100 may detect the relative position of the user 300. Also, the visible region 10 may be set based on the edge type and the relative position of the user 300. Herein, the edge-type display device 100 may include a screen region surrounding the edge type.

In FIG. 9B, the visible region 10 may be determined in an edge screen region between the edge-type display device 100 and the user 300.

The controller 110 may display a 3D image on the visible region 10 determined among the edge-type entire screen region.

Also, the controller 110 may determine the visible region 10 by using at least one of the relative position of the user 300, the eye position of the user 300, the eye direction of the user 300, and the gesture of the user 300. Also, the display device 100 may render a 3D image according to the attribute of the determined visible region 10. Also, the display device 100 may display the 3D image on the visible region 10.

Figure 10:
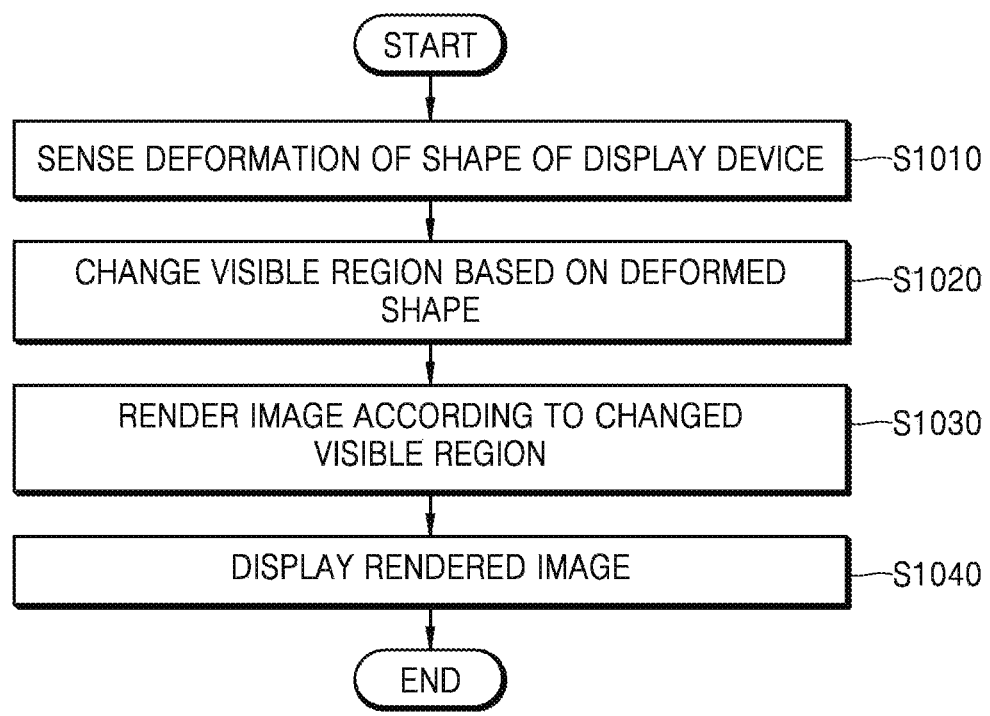
FIG. 10 is a flowchart illustrating a method of displaying an image as the shape of a display device is deformed, according to an embodiment.

FIG. 10 is a flowchart illustrating a method of displaying an image as the shape of a display device is deformed, according to an embodiment.

In operation S1010, the display device 100 may sense that the shape of the display device 100 is deformed. The display device 100 may sense the deformation of the shape of the display device 100 in real time. The display device 100 may determine in real time a new current shape of the display device 100 with respect to the current shape of the display device 100.

For example, the display device 100 may sense the unfolding curvature, the unfolding angle, the bending curvature, and the rolling degree of the display device 100. Also, in the case of the display device 100 including a plurality of screens, it may sense the placed state of the screen, the placed direction of the screen, the shape of the screen, and the like.

In operation S1020, the display device 100 may change the visible region based on the deformed shape of the display device 100. The display device 100 may change the visible region in real time based on the deformation parameter or the deformation degree of the display device 100. The display device 100 may change the attribute of the visible region based on the deformed shape of the display device 100, for example, the unfolding curvature, the unfolding angle, the bending curvature, and the rolling degree of the display device 100.

In operation S1030, the display device 100 may render an image according to the changed visible region. The display device 100 may render a 3D image according to the attribute of the changed visible region. The display device 100 may render a 3D image in real time based on the changed visible region. The display device 100 may determine the number of polygons necessary for rendering the 3D image, based on the changed visible region. Also, the display device 100 may render a 3D image by using a suitable number of determined polygons.

In operation S1040, the display device 100 may display the rendered image on the visible region. The display device 100 may display the rendered 3D image on the changed visible region. That is, as the shape of the display device 100 is deformed, the 3D image rendered in real time may be displayed on the visible region.

Figure 11:
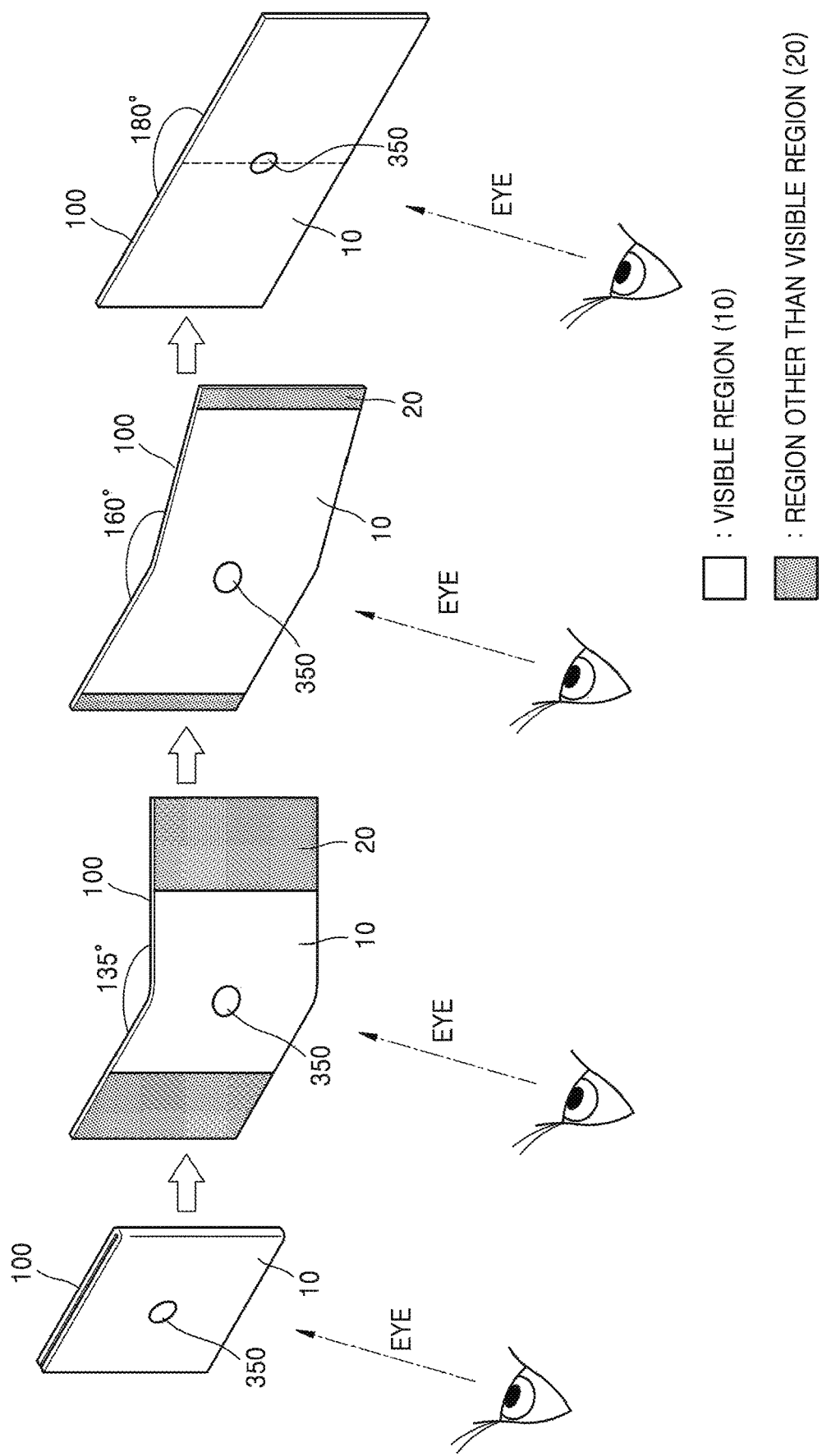
FIG. 11 is a diagram illustrating displaying of an image as the shape of a display device is deformed, according to an embodiment.

FIG. 11 is a diagram illustrating an embodiment of displaying an image as the shape of a display device is deformed, according to an embodiment.

Herein, the display device 100 will be described as an example of a flexible display device in which two screens are connected through a folding axis. The folding axis may represent a line where the display device 100 is folded. As an embodiment, the folding axis may be a center line of the display device 100 when the display device 100 is folded symmetrically. However, when the flexible display device 100 is folded asymmetrically, the folding axis may not be the center line of the flexible display device 100.

Referring to FIG. 11, illustrated are states where the deformation degree (e.g., the unfolding angle or bending curvature) of the display device 100 is "0 degrees", "135 degrees", "160 degrees", and "180 degrees". In FIG. 11, the user 300 may maintain the eye at the same position, and only the state of the display device 100 may be deformed.

When the deformation degree (or deformation state) of the display device 100 is 0 degree, the display device 100 may sense the current shape of the display device 100 as a 0-degree unfolded state.

The display device 100 may determine the user eye position 350 from the captured image of the user 300. The display device 100 may determine the visible region 10 from the user eye position 350 and the 0-degree unfolded state of the display device 100.

The display device 100 may render a 3D image to be displayed in the determined visible region 10. Also, the display device 100 may display an image on the determined visible region 10.

When the deformation degree of the display device 100 is 135 degrees, the controller 110 may sense the current shape of the display device 100 as a 135-degree unfolded state.

The display device 100 may determine the user eye position 350 from the captured image of the user 300. The display device 100 may redetermine the visible region 10 from the user eye position 350 and the 135-degree unfolded state of the display device 100.

The display device 100 may determine the remainder screen region 20 other than the redetermined visible region 10 based on the user eye position 350 and the 135-degree unfolded state of the display device 100. The display device 100 may change the color of the remainder screen region 20 other than the visible region 10.

The display device 100 may render a 3D image to be displayed in the redetermined visible region 10. Also, the display device 100 may deactivate the screen region 20 other than the visible region 10. The display device 100 may display an image on the redetermined visible region 10.

Next, when the deformation degree of the display device 100 is 160 degree, the display device 100 may sense the current shape of the display device 100 as a 160-degree unfolded state.

The display device 100 may determine the user eye position 350 from the captured image of the user 300. The display device 100 may redetermine the visible region 10 from the user eye position 350 and the 160-degree unfolded state of the display device 100.

For example, referring to FIG. 11, when the deformation degree of the display device 100 is 160 degrees, the visible region 10 may be set to have a larger size than the visible region 10 when the deformation degree of the display device 100 is 135 degrees. However, the present disclosure is not limited thereto.

The display device 100 may determine the remainder screen region 20 other than the redetermined visible region 10 based on the user eye position 350 and the 160-degree unfolded state of the display device 100. The display device 100 may change the color of the remainder screen region 20 other than the visible region 10.

The display device 100 may render a 3D image to be displayed in the redetermined visible region 10. Also, the display device 100 may deactivate the screen region 20 other than the visible region 10. The display device 100 may display an image on the redetermined visible region 10.

Lastly, when the deformation degree of the display device 100 is 180 degree, the display device 100 may sense the current shape of the display device 100 as a 180-degree unfolded state.

The display device 100 may determine the user eye position 350 from the captured image of the user 300 located at the same position. The display device 100 may redetermine the visible region 10 from the user eye position 350 and the 180-degree unfolded state of the display device 100.

For example, referring to FIG. 11, when the deformation degree of the display device 100 is 180 degrees, the visible region 10 may be set to have a larger size than those in the other deformation states of the display device 100. However, the present disclosure is not limited thereto.

The display device 100 may determine the remainder screen region 20 other than the redetermined visible region 10 based on the user eye position 350 and the 180-degree unfolded state of the display device 100. The display device 100 may change the color of the remainder screen region 20 other than the visible region 10.

The display device 100 may render a 3D image to be displayed in the redetermined visible region 10. Also, the display device 100 may deactivate the screen region 20 other than the visible region 10. The display device 100 may display an image on the redetermined visible region 10.

Figure 12:
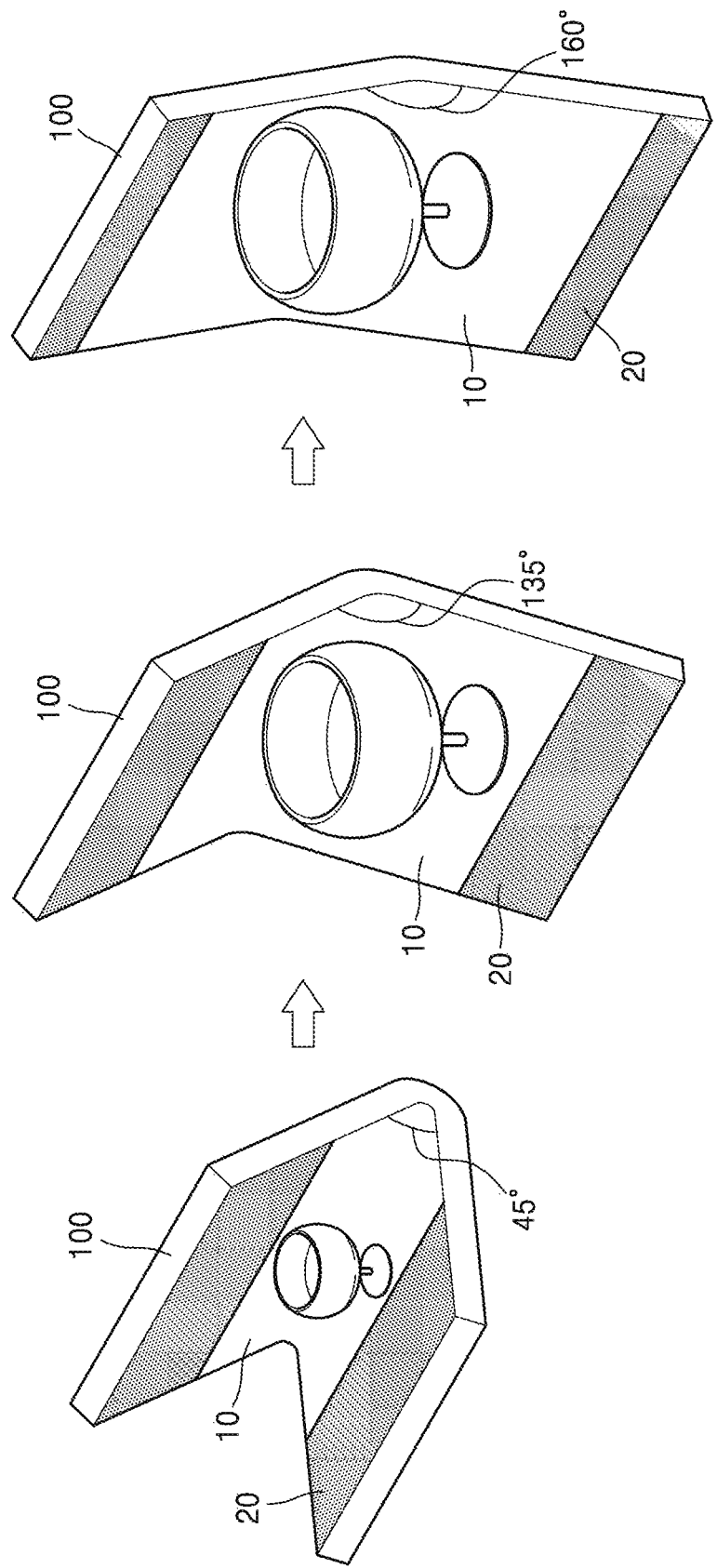
FIG. 12 is a diagram illustrating displaying of an image as the shape of a display device is deformed, according to an embodiment.

FIG. 12 is a diagram illustrating an embodiment of displaying an image as the shape of a display device is deformed, according to an embodiment.

Herein, the display device 100 will be described as an example of a flexible display device in which one screen is bent flexibly. The flexible display device 100 may refer to a bendable display device and may be bent or flexed without damage through a paper-thin and flexible substrate. Since the screen of the flexible display device 100 uses a plastic substrate instead of a generally used glass substrate, it may be formed by using a low-temperature manufacturing processor without using a related-art manufacturing processor in order to prevent damage to the substrate. The screen of the flexible display device 100 may be given flexibility for folding and unfolding, by substituting a plastic film for a glass substrate surrounding the liquid crystal in a liquid crystal display (LCD), a light emitting diode (LED), an organic LED (OLED), an active matrix OLED (AMOLED), or the like.

Referring to FIG. 12, the display device 100 may sense the current shape of the display device 100. That is, the display device 100 may sense the bent shape of the display device 100.

As illustrated in FIG. 12, the bending degree of the display device 100 may change continuously in the order of 45 degrees, 135 degrees, and 160 degrees.

The display device 100 may determine the visible region 10 based on the bending degree of the display device 100. Herein, it is assumed that the relative position of the user 300 with respect to the display device 100 is unchanged.

According to an embodiment, the attribute of the visible region may change as the bending angle of the display device 100 increases. As illustrated in FIG. 12, the region occupied by the visible region 10 among the entire screen region may increase as the bending angle of the display device 100 increases.

The display device 100 may display a 3D image in the visible region 10 that changes according to the bending angle of the display device 100. In this case, the 3D image may include a 3D image rendered based on the attribute of the visible region 10.

Also, the display device 100 may deactivate the screen region 20 other than the visible region 10 among the entire screen region. That is, the display device 100 may efficiently render the 3D image to be displayed only on the visible region 10, and may efficiently perform a process of the display device 100 by deactivating the screen region 20 other than the visible region 10.

Figure 13A:
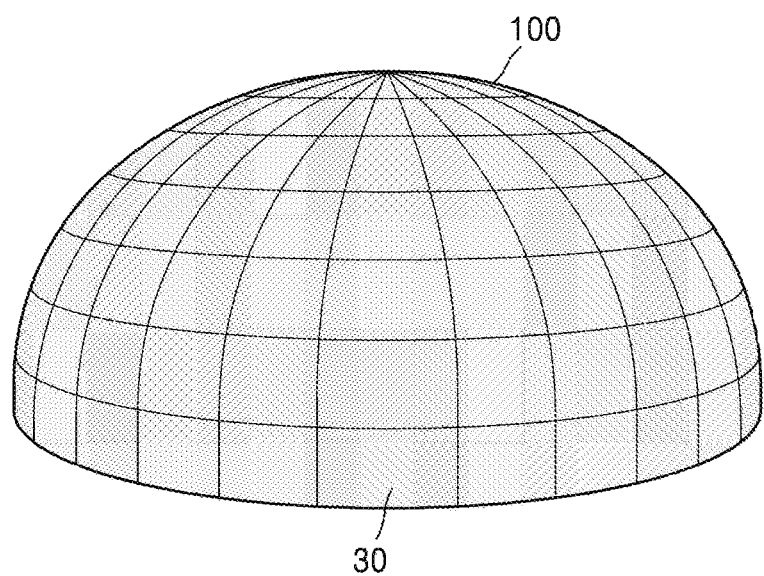
FIGS. 13A and 13B show diagrams illustrating a method of rendering a 3D image according to the shape of a display device, according to an embodiment.

FIGS. 13 (*a*) and (*b*) is a diagram illustrating a method of rendering a 3D image according to the shape of a display device, according to an embodiment.

The display device 100 illustrated in FIG. 13 will be described as an example of a semispherical display device.

The display device 100 may determine the current shape of the display device 100. In FIG. 13, the display device 100 may be a semispherical display device including a plurality of screens.

The display device 100 may display a 3D image by using all of the plurality of screens of the display device 100. As illustrated in FIG. 13(*a*), the controller 110 may determine the number of polygons 30 forming each screen in order to display data on the display device 100.

The display device 100 may determine the number of polygons 30 of a suitable size by considering the hardware performance of the display device 100. Since the number of polygons 30 that may be rendered in real time by the display device 100 is limited, the display device 100 may determine the number of polygons 30 optimized for the image display speed. Also, the display device 100 may change the 3D image by changing only the coordinate values of polygons.

More particularly, the display device 100 may determine the number of polygons by considering the attribute of the visible region, the relative position of the user, the eye position of the user, the gesture of the user, the eye direction of the user, and the like.

For example, the attribute of the visible region may be changed according to the relative position of the user. Particularly, the display device 100 may sense the attribute of the visible region that is changed from the 100% size of the entire screen region to the 70% size of the entire screen region. The display device 100 may redetermine the number of polygons for rendering the 3D image, based on the attribute of the reduced visible region. That is, the display device 100 may determine the number of polygons of a suitable size according to the current hardware state of the display device 100 and the attribute of the visible region and may render an optimized 3D image by using the same.

Also, the display device 100 may limit the size and the number of polygons based on the software attribute and the hardware performance of the display device 100. The display device 100 may render a 3D image based on the attribute of the visible region and the range of the limited number of polygons. That is, the display device 100 may provide the effect of efficiently using the display device 100, by rendering the 3D image by a predetermined size and number of polygons according to hardware performance and the software attribute.

Figure 13B:
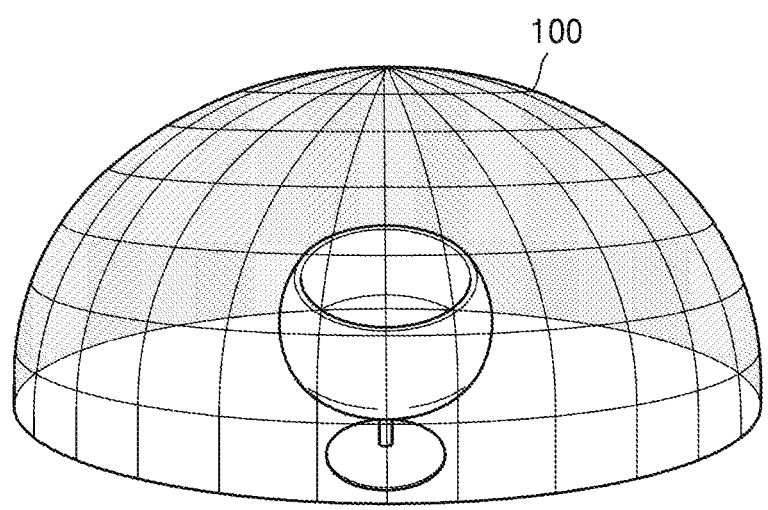

In FIG. 13(b), the display device 100 may render a 3D image by using an optimized number of polygons 30.

The 3D image rendering without considering the relative position of the display device 100 and the user 300 according to an embodiment has been described above with reference to FIG. 13. However, the present disclosure is not limited thereto, and the display device 100 may determine the visible region based on the current shape of the display device 100 by considering the relative position of the display device 100 and the user 300. Also, the display device 100 may display an image suitable to be displayed on the determined visible region.

According to another embodiment, the display device 100 may render a 3D image based on the relative position of the user 300 and the current shape of the display device 100. In this case, since the displayed image may be rendered only on the determined visible region, the rendering speed and the image quality may be improved.

Figure 14:
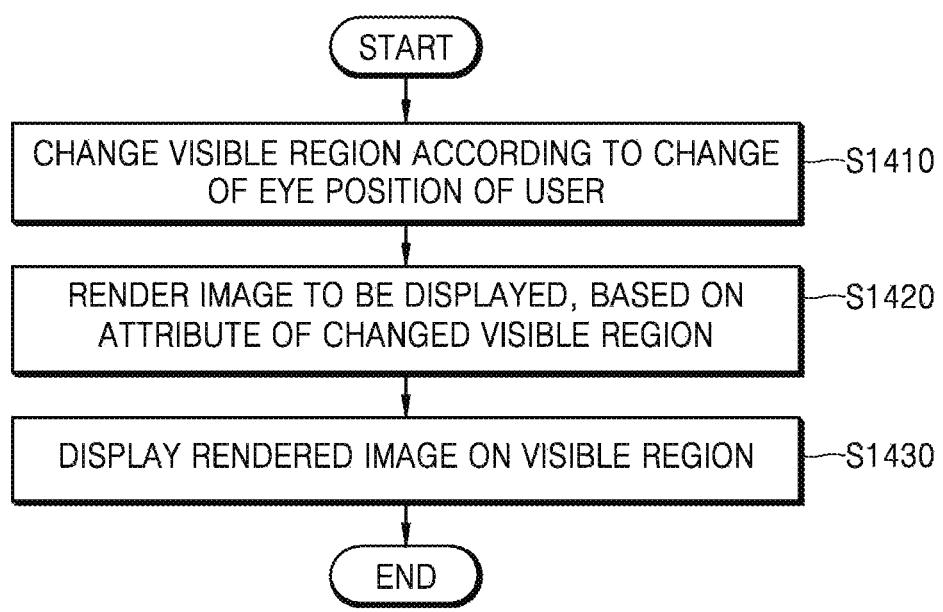
FIG. 14 is a flowchart illustrating a method of changing a visible region according to a change in eye position, according to an embodiment.

FIG. 14 is a flowchart illustrating a method of changing a visible region according to an eye position change, according to an embodiment.

Referring to FIG. 14, according to an embodiment, the visible region may be reset according to a change in the relative position between the user 300 and the display device 100.

In operation S1410, the display device 100 may change the visible region as the eye position of the user 300 changes. The eye position of the user 300 may represent the position on the screen in the direction of the eye of the user 300. The eye position of the user 300 may be determined from the captured image of at least a portion of the body of the user 300 including the pupil of the user 300. Also, the display device 100 may change the visible region in real time as the eye position of the user 300 changes.

Also, the display device 100 may determine the eye direction of the user 300. According to an embodiment, the position of the eye direction of the user 300 may be determined from the image including the pupil of the user 300. For example, when it is not necessary to display an image corresponding to the eye direction deviating from a certain range in terms of the shape of the screen and the design of the display device 100, the visible range to be changed may be limited to a certain range.

Also, the display device 100 may change the eye position according to the distance between the display device 100 and the user. For example, when the distance between the user and the display device sensed by the display device 100 increases, the user may change the eye position by considering the view range in which the user may view the image.

Also, the display device 100 may change the eye position based on the gesture of the user sensed by the display device 100. For example, when the display device 100 operates the camera to sense the user, it may sense the gesture of the user for changing the eye position together. In this case, the display device 100 may determine or change the eye position of the user from the image including the gesture of the user.

Also, the display device 100 may change the eye position of the user based on the eye direction of the user sensed by the display device 100. The display device 100 may detect the eye direction of the user by measuring the angle between the display device 100 and the pupil of the user sensed in the captured image of the user. The display device 100 may change the eye position of the user according to a change in the eye direction of the user.

Also, the display device 100 may redetermine the visible region according to the determined or changed eye position.

In operation S1420, the display device 100 may render an image to be displayed based on the attribute of the changed visible region. The attribute of the visible region may include at least one of the size, position, and shape of the visible region.

According to an embodiment, the 3D image may be rendered in real time based on the attribute of the changed visible region. According to an embodiment, the screen region other than the visible region among the entire screen region may be deactivated.

In operation S1430, the display device 100 may display the rendered image on the visible region. The rendered image may include a 3D image optimized for the attribute of the visible region.

Accordingly, the visible region may be reset according to a change in the eye position of the user, and the 3D image may be rendered according to the attribute of the reset visible region. Also, the rendered 3D image may be displayed on the visible region.

Figure 15:
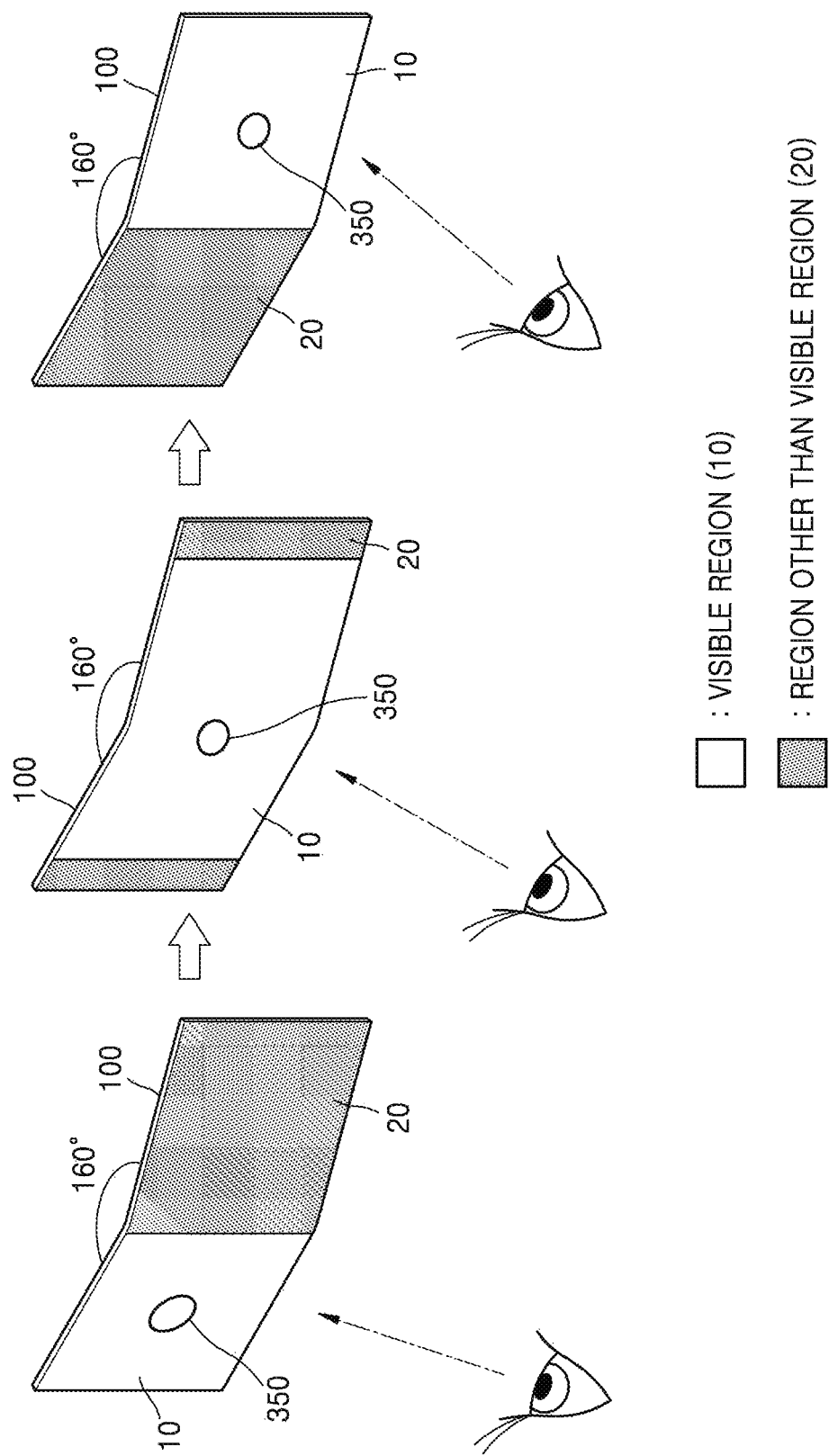
FIGS. 15, 16, and 17 are diagrams illustrating change of a visible region according to a change of the relative position of a user, according to embodiments.
Figure 16:
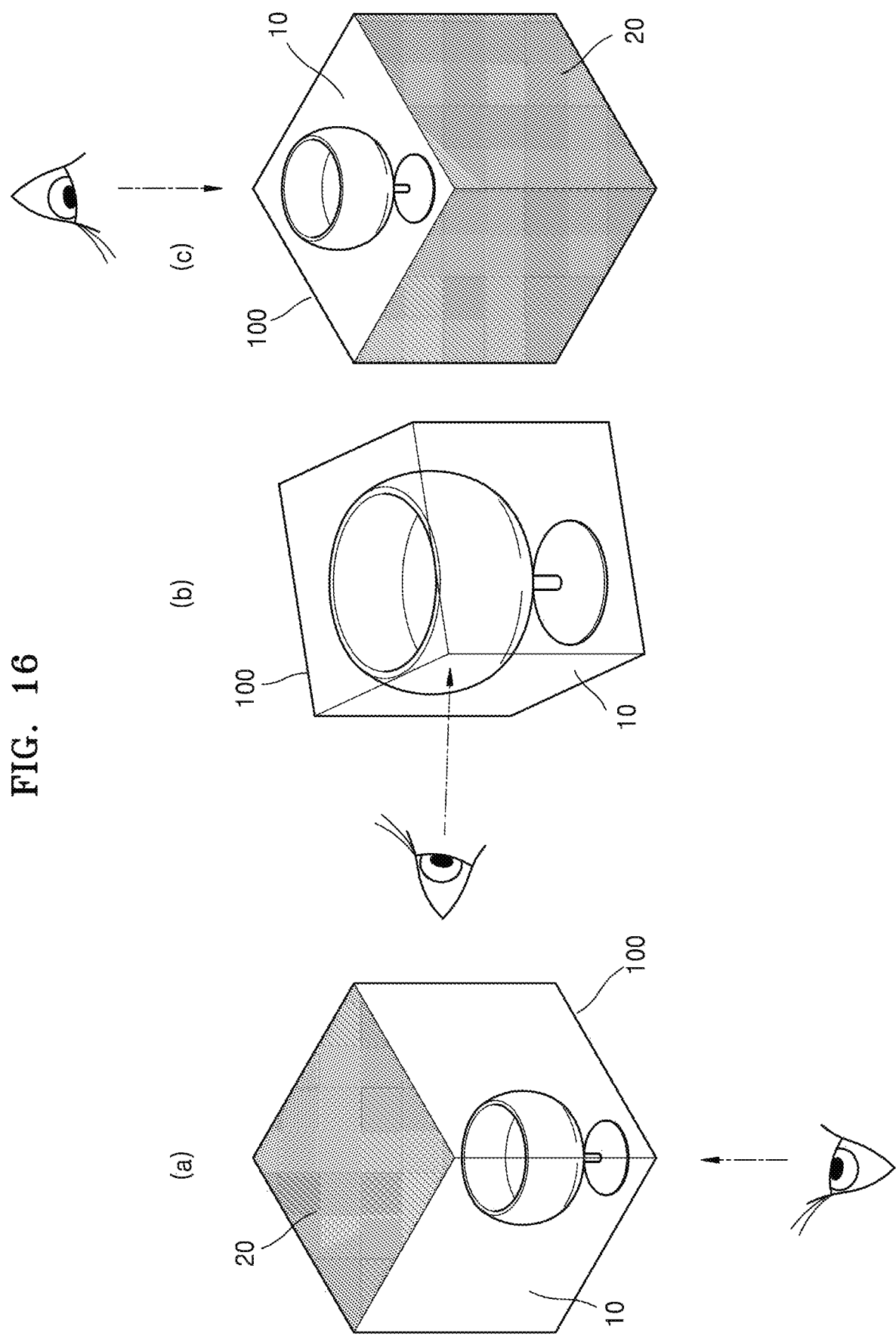
Figure 17:
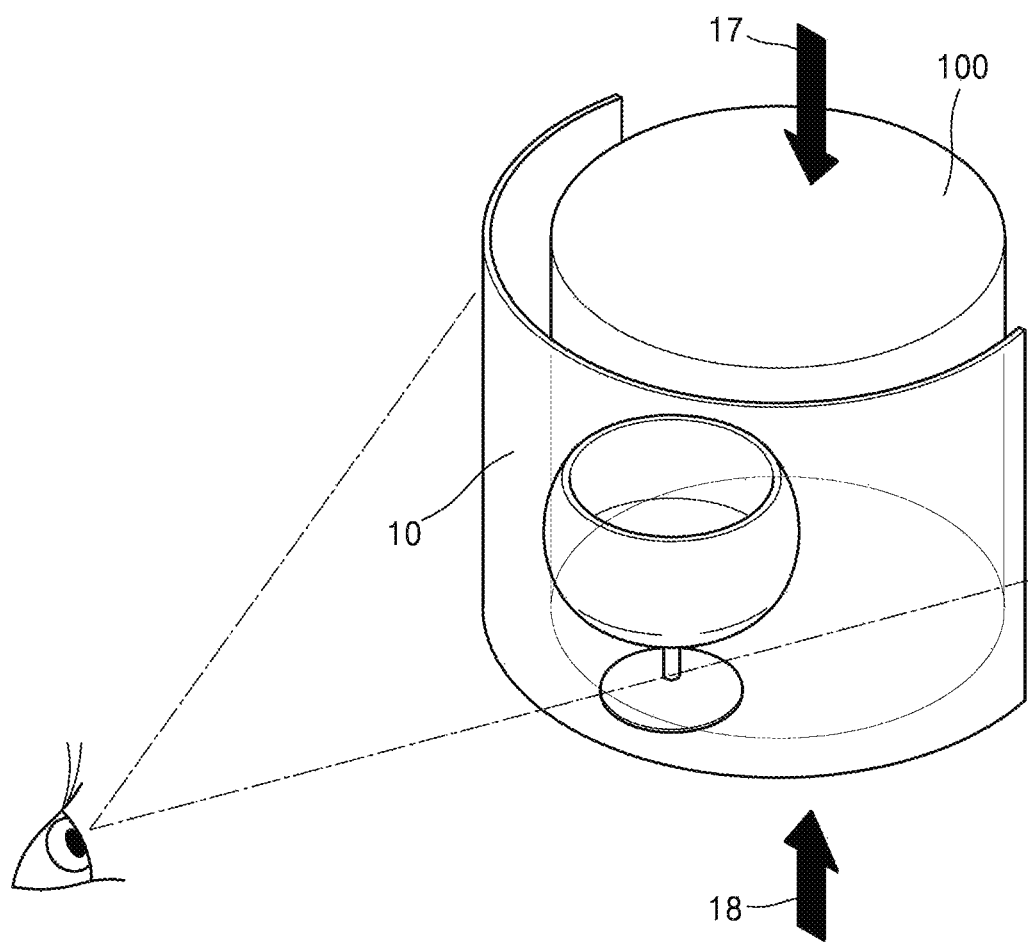

FIGS. 15, 16, and 17 are diagram illustrating embodiments in which a visible region is changed according to the change of the relative position of the user 300, according to an embodiment.

FIG. 15 is a diagram illustrating an embodiment of changing a visible region when the eye position of a user is changed with respect to the display device 100 having a fixed shape, according to an embodiment.

In FIG. 15, the display device 100 will be described as an example of a flexible display device 100 in which two screens are connected through a folding axis. Herein, the current state of the display device 100 may be a 160-degree unfolded state. The current state of the display device 100 may be a state in which two screens are fixed while being unfolded at 160 degrees.

According to an embodiment, the display device 100 may detect the relative position of the user 300 in the image including at least a portion of the body of the user 300 including the pupil of the user 300. More particularly, the display device 100 may determine the eye position 350 of the user 300 based on the image including the pupil of the user 300.

As illustrated in FIG. 15, according to an embodiment, the eye position 350 of the user may be detected in the left screen of the display device 100.

The display device 100 may determine the visible region 10 based on the current shape of the display device 100 and the eye position 350 of the user. According to an embodiment, the visible region 10 may be determined only in the left screen of the display device 100.

According to an embodiment, the colors of the background screens displayed in the visible region 10 and the region 20 other than the visible region 10 among the entire screen region may be set to be different. Accordingly, the user 300 may identify the screen region determined as the visible region 10.

According to another embodiment, the eye position 350 of the user may be moved. That is, the relative position of the user detected by the display device 100 may be changed. More particularly, the eye position 350 of the user determined based on the image including the user's pupil may be changed.

According to another embodiment, the display device 100 may redetermine the visible region 10 based on the current shape of the display device 100 and the eye position 350 of the user. As illustrated in FIG. 15, the changed eye position 350 of the user may be detected around the folding axis of the display device 100.

The display device 100 may redetermine the visible region 10 based on the current shape of the display device 100 and the changed eye position 350 of the user. According to an embodiment, the visible region 10 may be determined in a partial region of the left screen and a partial region of the right screen of the display device 100.

According to an embodiment, the display device 100 may set different colors of the background screens displayed in the visible region 10 and the region 20 other than the visible region 10 among the entire screen region. Accordingly, the user 300 may identify the screen region determined as the visible region 10.

The display device 100 may render a 3D image according to the attribute of the changed visible region 10. Also, the display device 100 may display the 3D image on the changed visible region 10.

According to another embodiment, the eye position 350 of the user may be moved. That is, the relative position of the user detected by the display device 100 may be changed. More particularly, the eye position 350 of the user 300 determined based on the image including the pupil of the user 300 may be changed.

The display device 100 may redetermine the visible region 10 based on the current shape of the display device 100 and the eye position 350 of the user. As illustrated in FIG. 15, the changed eye position 350 of the user may be detected in the right screen of the display device 100.

The display device 100 may redetermine the visible region 10 based on the current shape of the display device 100 and the changed eye position 350 of the user. According to an embodiment, the visible region 10 may be determined in the right screen region of the display device 100.

According to an embodiment, the display device 100 may set different colors of the background screens displayed in the visible region 10 and the region 20 other than the visible region 10 among the entire screen region. Accordingly, the user 300 may identify the screen region determined as the visible region 10.

The display device 100 may render a 3D image according to the attribute of the changed visible region 10. Also, the display device 100 may display the 3D image on the changed visible region 10.

FIG. 16 is a diagram illustrating an embodiment of displaying an image on a visible region determined according to the position of the user 300 in a display device having a hexahedral shape, according to an embodiment.

In FIG. 16(*a*), according to the current shape of the display device 100 and the relative position of the user 300 and the display device 100, the visible region may be determined on two surfaces of a hexahedral display device 100.

In FIG. 16(*b*), according to the current shape of the display device 100 and the relative position of the user 300 and the display device 100, the visible region may be determined on three surfaces of the hexahedral display device 100.

In FIG. 16(*c*), according to the current shape of the display device 100 and the relative position of the user 300 and the display device 100, the visible region may be determined on one surface of the hexahedral display device 100.

According to an embodiment, the display device 100 may render a 3D image according to the attribute of each determined visible region. Next, the 3D image may be displayed on each determined visible region.

As illustrated in FIG. 16, according to an embodiment, the display device 100 may efficiently display the 3D image according to the number of screens included in the display device 100, the current shape of the display device 100, and the relative position of the user 300.

According to an embodiment, a polyhedral display device 100 including a plurality of screens may display a 3D image more realistically. For example, as illustrated in FIG. 16, the display device 100 may represent a stationary object by using a 3D image.

As illustrated in FIG. 16(*a*), a 3D image of a wine glass may be displayed by using two screens. In this case, the user may identify the image of the wine glass that appears when the user views one edge of the display device 100.

According to the relative position of the user sensed in FIG. 16(*b*), the display device 100 may display an image by using three screens. Accordingly, the user may identify an image of the overall shape of the wine glass.

In FIG. 16(*c*), since the user views the top surface of the display device 100 at a position higher than the display device 100, the user may view a 3D image of the top surface of the wine glass.

As illustrated in FIG. 17, according to an embodiment, the display device 100 may include a cylindrical display device.

The display device 100 may include two circular screens and a screen including a flexible display substrate. The screens included in the display device 100 may be connected to each other.

According to another embodiment, the display device 100 may determine the visible region 10 based on the current shape of the display device 100 and the detected relative position of the user 300. Referring to FIG. 17, based on the eyes of the user 300, the visible region 10 may be determined on the side surface of the cylindrical display device 100.

According to another embodiment, the display device 100 may set the visible region on the top side of the display device 100 when the detected relative position of the user 300 is in the direction of an arrow 17 on the top side of the display device 100.

According to another embodiment, the display device 100 may set the visible region on the bottom side of the display device 100 when the detected relative position of the user 300 is in the direction of an arrow 18 on the bottom side of the display device 100.

According to an embodiment, the display device 100 may render a 3D image according to the attribute of the determined visible region 10. Also, the 3D image may be displayed on the visible region 10.

Figure 18:
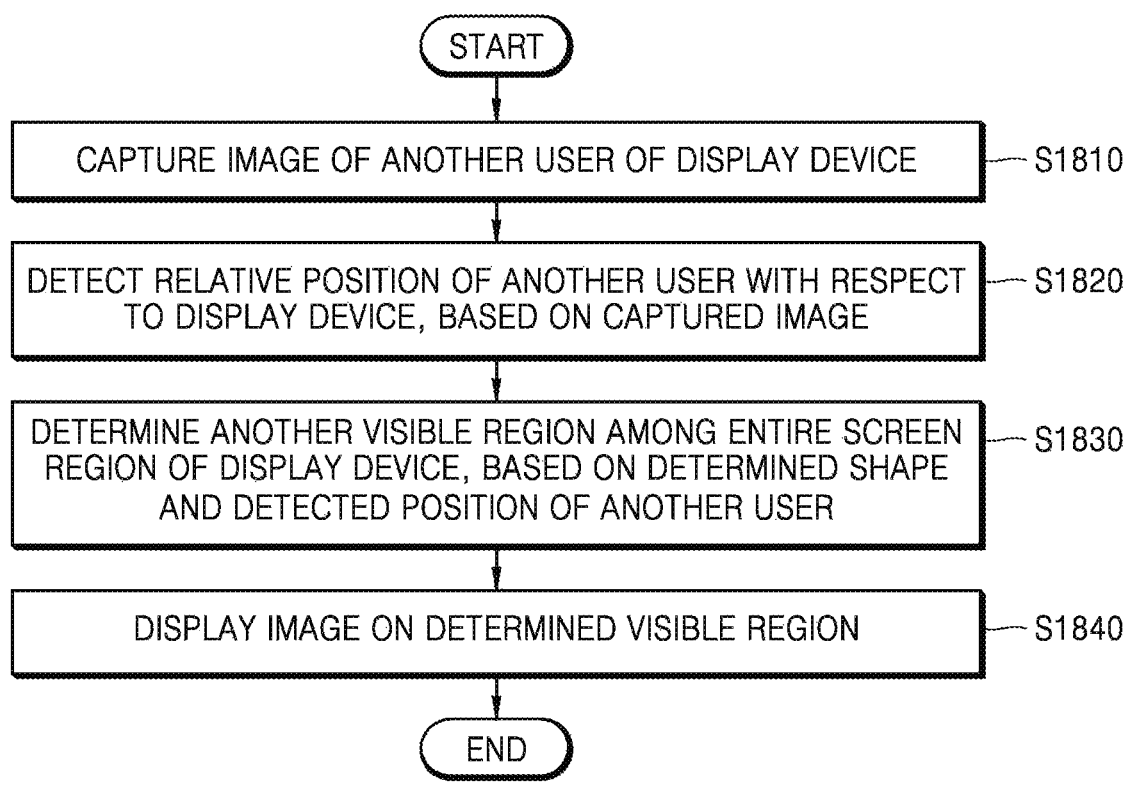
FIG. 18 is a flowchart illustrating a method of displaying an image on another visible region when there is another user, according to an embodiment.

FIG. 18 is a flowchart illustrating a method of displaying an image on another visible region when there is another user, according to an embodiment.

As illustrated in FIG. 18, according to an embodiment, the display device 100 may set at least two visible regions.

In operation S1810, according to an embodiment, the display device 100 may capture an image of another user 301 of the display device 100. A camera for capturing the image of the other user 301 may be different from the camera for capturing the image of the user 300. The camera for capturing the image of the other user 301 may be determined based on the current shape of the display device 100.

In operation S1820, the display device 100 may detect the relative position of the other user 301 with respect to the display device 100 based on the captured image. The relative position of the other user 301 may be a position that does not overlap with the user 300. However, the present disclosure is not limited thereto. According to an embodiment, the display device 100 may detect the relative position of the other user 301 by determining the eye position of the other user 301.

In operation S1830, the display device 100 may determine another visible region 15 among the entire screen region of the display device 100, based on the determined current shape of the display device 100 and the detected position of the other user 301.

According to an embodiment, the current shape of the display device 100 may include the current shape of the display device 100 determined to set the visible region 10 of the user 300.

The other visible region may not overlap the predetermined visible region among the entire screen region of the display device 100. According to an embodiment, the visible region 10 and the other visible region 15 may be determined on different screens based on the current state of the display device 100.

In operation S1840, the display device 100 may display an image on the determined other visible region 15. Herein, the image displayed on the other visible region 15 may include a 3D image. Also, the image displayed on the other visible region 15 may be different from the image displayed on the visible region 10. However, the present disclosure is not limited thereto.

Also, the display device 100 may render the image displayed on the other visible region 15, according to the attribute of the other visible region 15. The attribute of the other visible region 15 may include the size, shape, and position of the other visible region 15.

According to an embodiment, the display device 100 may display an image for the other user 301 other than the user 300 on one display device 100, thus providing a dual-screen effect.

Figure 19:
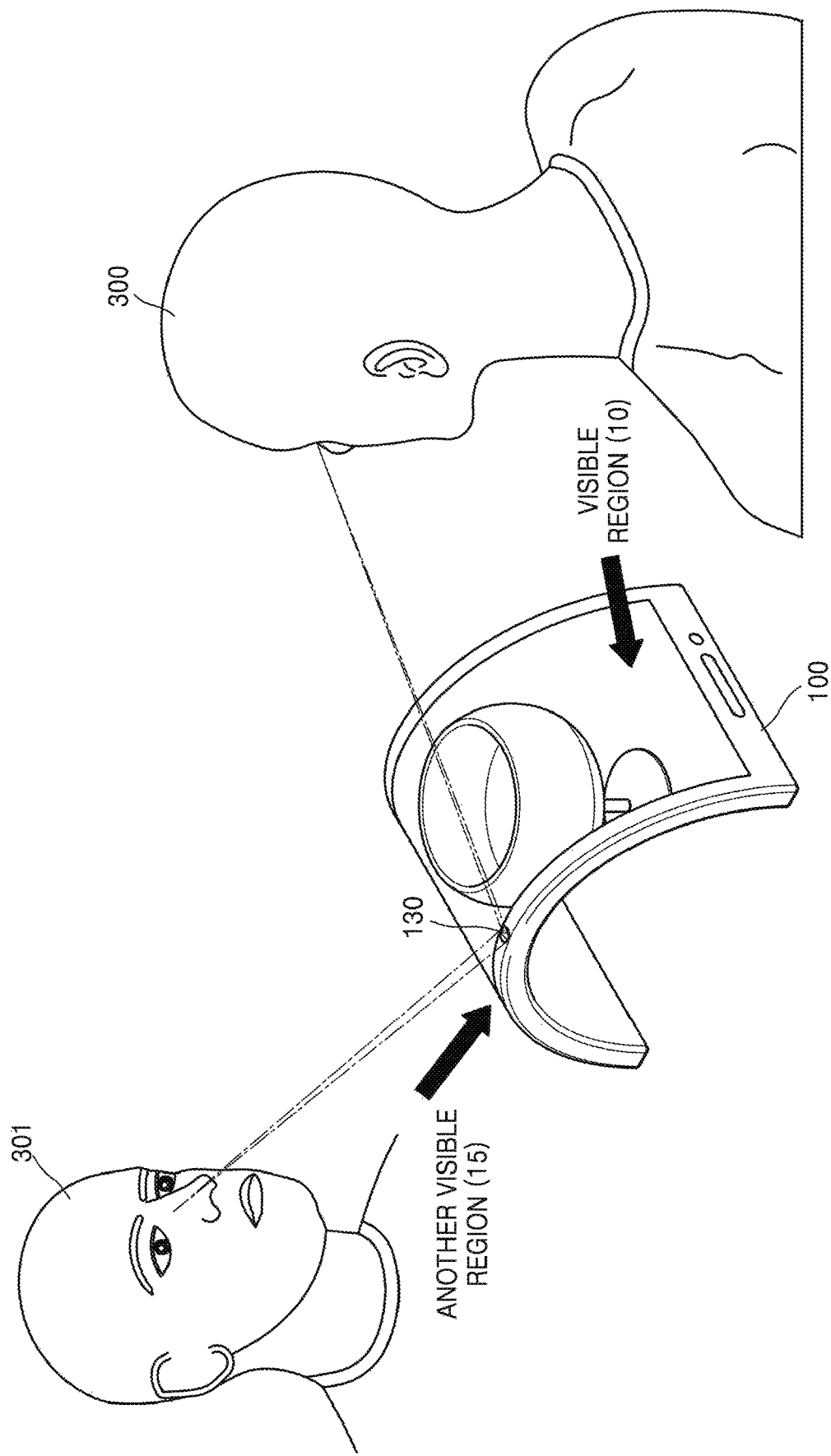
FIG. 19 is a diagram illustrating a display device for displaying an image when there is another user, according to an embodiment.

FIG. 19 is a diagram illustrating a display device for displaying an image when there is another user, according to an embodiment.

As illustrated in FIG. 19, the display device 100 may be a display device using a flexible substrate.

The display device 100 may be bent convexly toward the user 300. That is, a screen exposed outside from a display substrate may be bent convexly toward the user 300. For example, a piezoelectric sensor or an optical sensor may be located at the edge of a display substrate (not illustrated), and the controller 110 may use the piezoelectric sensor or the optical sensor to determine whether the display device is deformed into any shape and to determine the current shape of the display device.

Also, the deformation degree of a display substrate (not illustrated) may be continuously changed in the display device 100, and in this case, the display device 100 may sense a change in the current shape of the display device 100 in real time.

In an embodiment, the term "another user" may refer to a person controlling a function or operation of an image by using the display device 100 and may include a viewer, a manager, or an installer other than the user.

The display device 100 may sense the user to detect the position of the user 300 with respect to the display device. Herein, the display device 100 may use a camera provided in the display device 100, which may be a general camera or a depth camera capable of measuring the distance to a subject.

Also, the display device 100 may sense another user 301 of the display device 100. The display device 100 may detect the relative position of the other user 301 based on the image of the sensed other user 301.

For example, as illustrated in FIG. 19, the position of the other user 301 may be detected on one side of the convexly bent screen of the display device 100. In this case, the other user 301 is illustrated as being on the opposite side with respect to the user 300; however, the present disclosure is not limited thereto.

The display device 100 may determine another visible region 15 among the entire screen region of the display device 100 based on the current shape of the display device 100 and the relative position of the other user 301.

Herein, the other visible region 15 may refer to a screen region determined as a screen region that may be recognized by the other user 301 among the entire screen region of the display device. As illustrated in FIG. 19, the other visible region 15 may be determined in a screen region that does not overlap the visible region 10. For example, the other visible region 15 may be determined on the screen of the display device 100 that is bent convexly toward the other user 301.

Also, in the display device 100 including a plurality of screens, the other visible region 15 may be determined on another screen other than the remainder screen other than the visible region 10. However, the present disclosure is not limited thereto.

The display device 100 may render a 3D image based on the attribute of the determined other visible region 15. Herein, the image may be the same as or different from the image displayed on the visible region 10. When the images displayed on the visible region 10 and the other visible region 15 are different from each other, the display device 100 may render and display each image.

According to an embodiment, when there is another user, the display device 100 may determine new visible regions according to the current shape of the display device 100 and the relative position of the other user. For example, when a polyhedral display device includes a plurality of screens, each of the visible regions may be determined on each screen.

That is, the display device 100 may detect a plurality of users and display each of a plurality of images in the screen region set in one display device 100.

Figure 20:
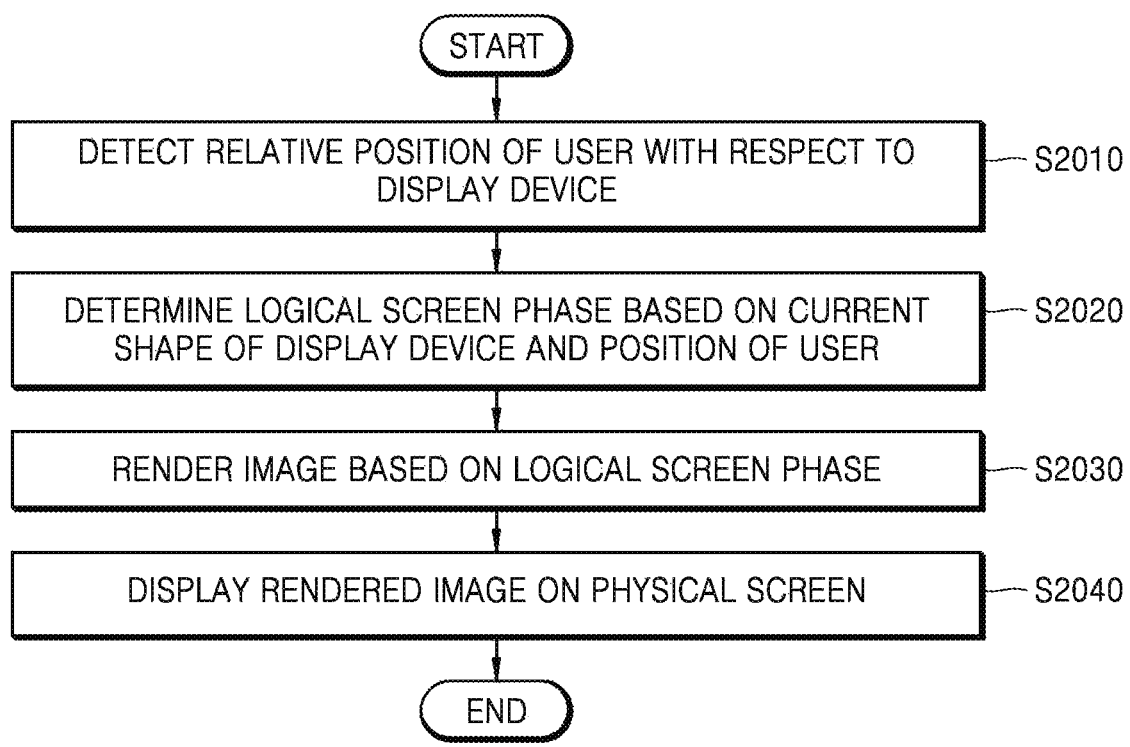
FIG. 20 is a flowchart illustrating a method of displaying an image on a display device, according to an embodiment.

FIG. 20 is a flowchart illustrating a method of displaying an image on a display device, according to an embodiment.

In operation S2010, the display device 100 may detect the relative position of the user with respect to the display device 100. The display device 100 may infer the relative position of the user 300 with respect to the display device 100, according to the position of a user image in the captured image.

In operation S2020, the display device 100 may determine a logical screen phase based on the current shape of the display device and the position of the user.

The display device 100 may determine whether the display device 100 is a flexible device, a foldable device, or an edge-type device. Also, the display device 100 may determine the bending degree of the device, the flexing degree thereof, the number and shape of edges thereof, and the like.

The display device 100 may measure the magnitude of the force causing the deformation of the display device 100 through the piezoelectric sensor. The display device 100 may determine the deformation degree of the display device 100 by analyzing the magnitude of the force applied to the display device 100.

The logical screen may refer to a virtual screen set in the display device 100. The logical screen may be screen data including the number of displayed characters and the screen size set in the display device 100, in order to input data given by a program used in the display device 100. The logical screen may be a virtual screen having a certain size that does not depend on the actual screen size of the display device 100.

The display device 100 may determine the logical screen according to the current shape of the display device 100. Also, the display device 100 may determine the phase of the logical screen based on the position of the user with respect to the display device 100. Also, the display device 100 may determine the phase of the logical screen based on all conditions that may be considered in the display device 100.

The phase of the logical screen may refer to the phase of the logical screen that is set by the display device 100 to efficiently render an image.

In operation S2030, the display device 100 may render an image based on the logical screen phase.

The display device 100 may determine the size of the image to be rendered and the number of polygons that may be displayed, based on the determined logical screen. The display device 100 may render a 3D image according to the phase of the logical screen.

In operation S2040, the display device 100 may display the rendered image on a physical screen. The display device 100 may display the rendered 3D image on the physical screen in real time.

The physical screen may refer to a physical screen included in the display device 100. The physical screen may be provided in plurality. The physical screen may be a deformed screen that is currently included in the display device 100.

Figure 21:
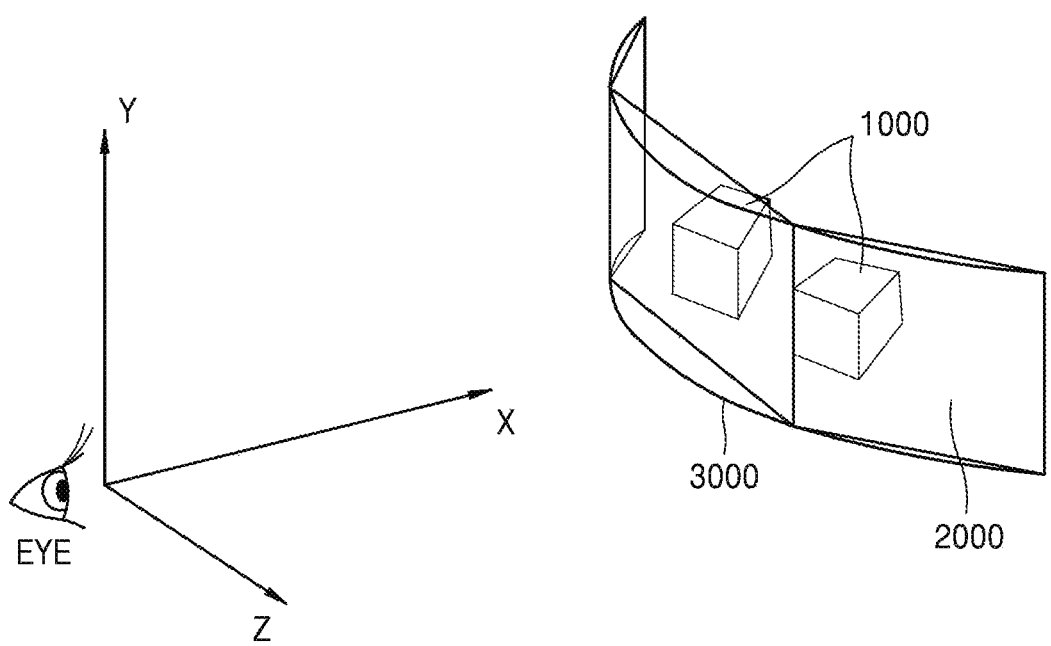
FIG. 21 is a diagram illustrating determination of a logical screen and a physical screen according to the shape of a display device and the eye of a user, according to an embodiment.

FIG. 21 is a diagram illustrating determining a logical screen and a physical screen according to the shape of a display device and the eye of a user, according to an embodiment.

According to an embodiment, the display device 100 may include a physical screen 3000 as an actual screen and a logical screen 2000 as a virtual screen. The display device 100 may construct the logical screen 2000 based on the eye position of the user and the deformation state of the physical screen 3000. Also, the display device 100 may render and display an object 1000 based on the logical screen 2000.

Figure 22A:
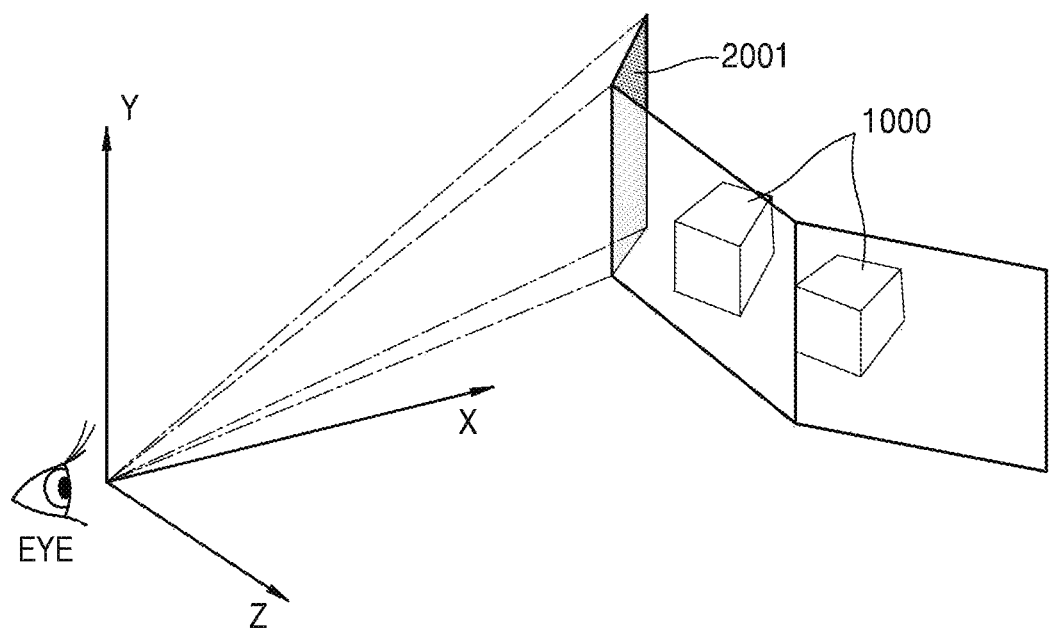
FIGS. 22A to 22C are diagrams illustrating determination of a logical screen in a display device, according to an embodiment.
Figure 22B:
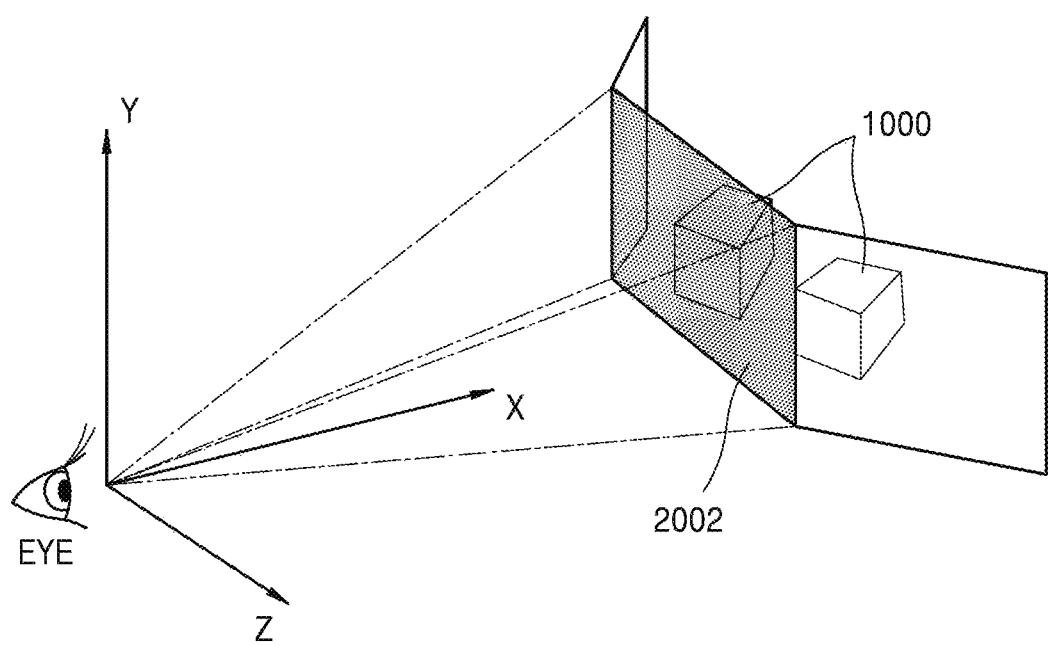
Figure 22C:
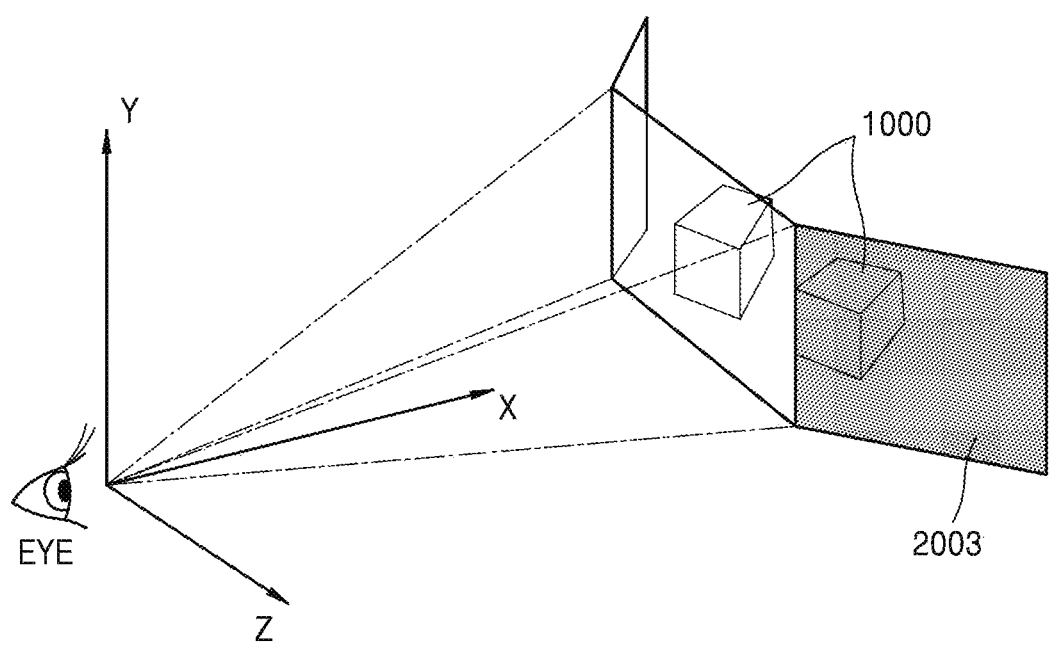

FIGS. 22A to 22C are diagrams illustrating determining a logical screen in a display device, according to an embodiment.

The display device 100 may set a viewport according to the position of the user with respect to the display device 100, the eye of the user, and the distance from the display device 100.

The viewport may refer to a predetermined region in the screen of the display device 100. The viewport may be a region set to display a graphic screen on a portion of the screen of the display device 100. The viewport may be set in a partial region or an entire region of the display device 100. A plurality of viewports may be set on the screen of the display device 100.

The viewport may refer to a rectangular region that actually displays a projection-converted figure in a rendering process for generating an image in computer graphics (CG). The display device 100 may perform only logical calculation of the coordinates of the screen, but the viewport may actually accord with the coordinate system of the screen of the display device 100 for displaying and printing the figure. Therefore, in order to display and output the figure calculated by the coordinate system of the screen of the display device 100, it may be necessary to perform coordinate conversion calculation by viewport conversion processing.

In FIG. 22A, the display device 100 may set a first viewport 2001. In FIG. 22B, the display device 100 may set a second viewport 2002. In FIG. 22C, the display device 100 may set a third viewport 2003.

The first viewport 2001 may be set based on the coordinates at an angle when the user views the left screen of the display device 100. The second viewport 2002 may be set based on the coordinates at an angle when the user views the center screen of the display device 100. The third viewport 2003 may be set based on the coordinates at an angle when the user views the right screen of the display device 100. However, the present disclosure is not limited thereto.

The display device 100 may set a plurality of logical screens to display the object 1000 viewed from various angles on one physical screen.

According to an embodiment, the display device 100 may set three viewports 2001, 2002, and 2003 to actually display the projection-converted figure in the rendering process.

Figure 23A:
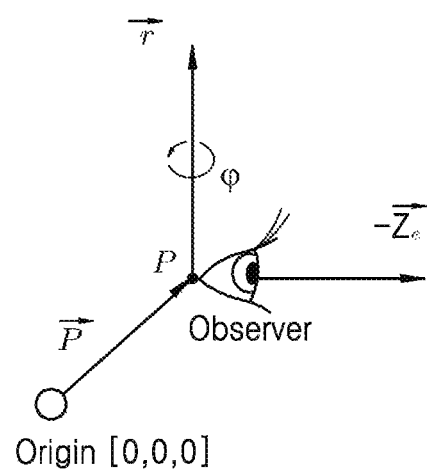
FIG. 23 is a diagram illustrating determination of a logical screen based on the position of a user and the current shape of a display device, according to an embodiment.
Figure 23B:
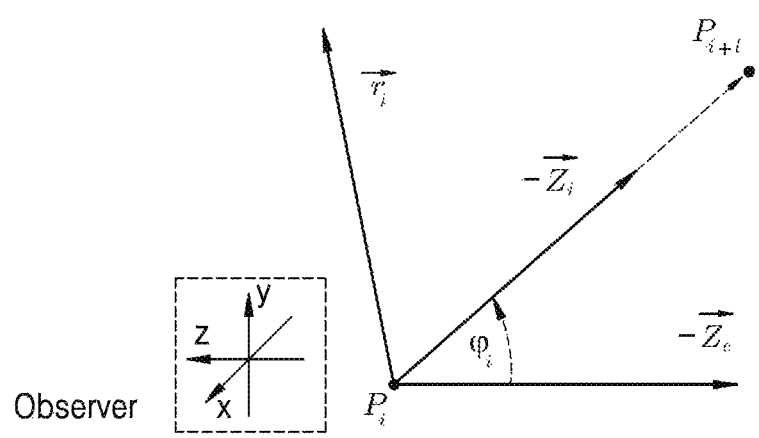

FIG. 23 is a diagram illustrating determining a logical screen based on the position of a user and the current shape of a display device, according to an embodiment.

In FIG. 23, (a) illustrates an example of implementing the eye of the user in Virtual Reality Modeling Language (VRML), and (b) illustrates the representation of the eye of the user on the plane coordinates.

Herein, the VRML may be a text file capable of representing a 3D space in an Internet document. The VRML may refer to the description language of graphics data representing a 3D space on the Internet.

As illustrated in FIG. 23, the display device 100 may recognize the user of the display device 100 and generate the coordinates of the position of the user.

In FIG. 23, the viewport may be determined by Equation 1.

Equation 1

$$\vec{d_i} = \overrightarrow{p_{i+1}} * \overrightarrow{p_i} =$$

$$\{(x_{i+1} - x_i), (y_{i+1} - y_i), (z_{i+1} - z_i)\} = [d_{x_i}, d_{y_i}, d_{z_i}] - \vec{z_i} = \frac{\vec{d_i}}{\|\vec{d_i}\|}$$

$$\vec{r_i} = \frac{-\vec{z_e} \times -\vec{z_i}}{\|-\vec{z_e} \times -\vec{z_i}\|} = \left[\left(\frac{d_{yi}}{\sqrt{dx_i^2 + dy_i^2}}\right), \left(\frac{-dxi}{\sqrt{dx_i^2 + dy_i^2}}\right), 0\right]$$

$$\cos\varphi i = -\vec{z_e} \cdot -\vec{z_i} = -\left(\frac{dz_i}{\|\vec{d_i}\|}\right)$$

In Equation 1, $\vec{d_1}$ may denote a position vector representing the direction of movement from $\vec{p_1}$ to $\vec{p_{1+1}}$.

$-\vec{z_1}$ may denote a unit vector in the movement direction.

Figure 24:
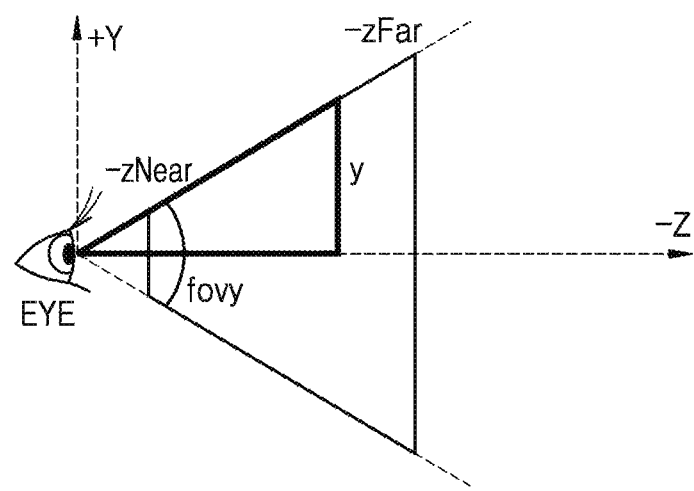
FIG. 24 is a diagram illustrating a configuration of space coordinates for determining the phase of a logical screen, according to an embodiment.

$-\vec{z_e}$ may denote a unit vector in an initial direction, which may represent $-\vec{z_e}=[0, 0, -1]$. FIG. 24 is a diagram illustrating a configuration of space coordinates for determining the phase of a logical screen, according to an embodiment.

Equation 2 represents a process of calculating the space coordinates illustrated in FIG. 24.

Equation 2

$$\tan\left(\frac{fovy}{2}\right) = \frac{y}{-z}$$

$$y = \tan\left(\frac{fovy}{2}\right) \times -z$$

By FIG. 24 and Equation 2, the phase of the logical screen may be predicted. The display device 100 may efficiently render a 3D image based on the predicted phase of the logical screen.

The display device 100 should accurately map the screen coordinates and the space coordinates in order to solve the problem of the screen being shaken when the 3D image and the 2D image are converted. In this case, fovy may be used or the coordinates may be used to map the screen coordinates and the space coordinates. However, the present disclosure is not limited thereto.

In the case of using the fovy, the depth of the space may be easily adjusted and the distortion degree of the space may be easily changed by adjusting the fovy value. The fovy may represent the view angle of the user, as illustrated in FIG. 24.

The display device may determine the logical screen in detail through Equation 3 below.

In Equation 3, the z value and the fovy value may depend on the measured value.

Equation 3

$$f = 1 / \tan\left(\frac{fovy}{2}\right)$$

$$y = \frac{-z}{f}$$

-continued $$y_{viewport} = fy / -z$$

$$x_{viewport} = \frac{fx}{aspect} / -z$$

$$z_{viewport} = m/z + C$$

$$m / -zNear + C = -1$$

$$m / -zFar + C = 1$$

$$m = (-1 - C) \times -zNear$$

$$m = (1 - C) \times -zFar$$

$$(-1 - C) \times -zNear = (1 - C) \times -zFar$$

$$zNear + C \times zNear = -zFar + C \times zFar$$

$$C \times (zNear - zFar) = -(zFar + zNear)$$

$$C = -\frac{(zFar + zNear)}{(zNear - zFar)}$$

$$m = \left(1 + \frac{(zFar + zNear)}{(zNear - zFar)}\right) \times -zFar$$

$$m = \left(\frac{(zNear - zFar) + (zFar + zNear)}{(zNear - zFar)}\right) \times -zFar$$

$$m = \left(\frac{2 \times zNear}{(zNear - zFar)}\right) \times -zFar$$

$$m = \left(\frac{-2 \times zNear \times zFar}{(zNear - zFar)}\right)$$

$$z_{viewport} = \left(\frac{2 \times zNear \times zFar}{(zNear - zFar)}\right) / -z - \left(\frac{zFar + zNear}{(zNear - zFar)}\right)$$

Figure 25:
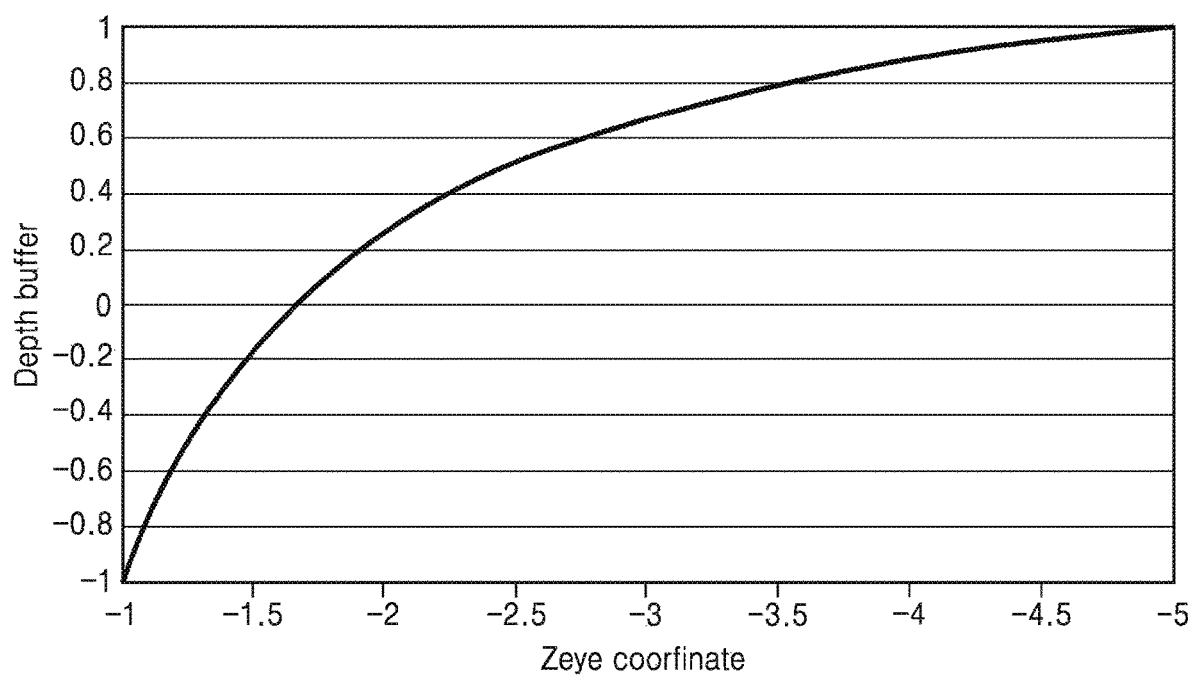
FIG. 25 is a graph illustrating a calculation for a logical screen, according to an embodiment.

FIG. 25 is a graph illustrating the calculation of a logical screen, according to an embodiment.

Referring to FIG. 25, a visible region viewed on the screen may be determined according to the eye position of the user. Also, a logical screen may be calculated to render an image displayed in the visible region.

FIG. 25 illustrates calculating the viewport coordinates ($x_{viewport}$, $y_{viewport}$, $z_{viewport}$) when the eye position of the user is set at (x, y, z) coordinates. The graph illustrated in FIG. 25 may be calculated by Equation 4.

Equation 4

$$x_{viewport} = \frac{fx}{aspect} / -z$$

$$y_{viewport} = fy / -z$$

$$z_{viewport} = \left(\frac{2 \times zNear \times zFar}{(zNear - zFar)}\right) / -z - \left(\frac{zFar + zNear}{(zNear - zFar)}\right)$$

$$z_{viewport} = \left(\frac{2 \times zNear \times zFar}{(zNear - zFar)} + \frac{zNear + zFar}{(zNear - zFar)} \times z\right) / -z$$

$$x_{clip} = \frac{fx}{aspect}$$

$$y_{clip} = fy$$

$$z_{clip} = \frac{zNear + zFar}{(zNear - zFar)} \times z + \frac{2 \times zNear \times zFar}{(zNear - zFar)}$$

$$w_{clip} = -z$$

$$x_{viewport} = x_{clip} / w_{clip}$$

$$y_{viewport} = y_{clip} / w_{clip}$$

$$z_{viewport} = z_{clip} / w_{clip}$$

-continued $$\begin{bmatrix} \frac{f}{aspect} & 0 & 0 & 0 \\ 0 & f & 0 & 0 \\ 0 & 0 & \frac{zNear + zFar}{(zNear - zFar)} & \frac{2 \times zNear \times zFar}{(zNear - zFar)} \\ 0 & 0 & -1 & 0 \end{bmatrix}$$

Figure 26:
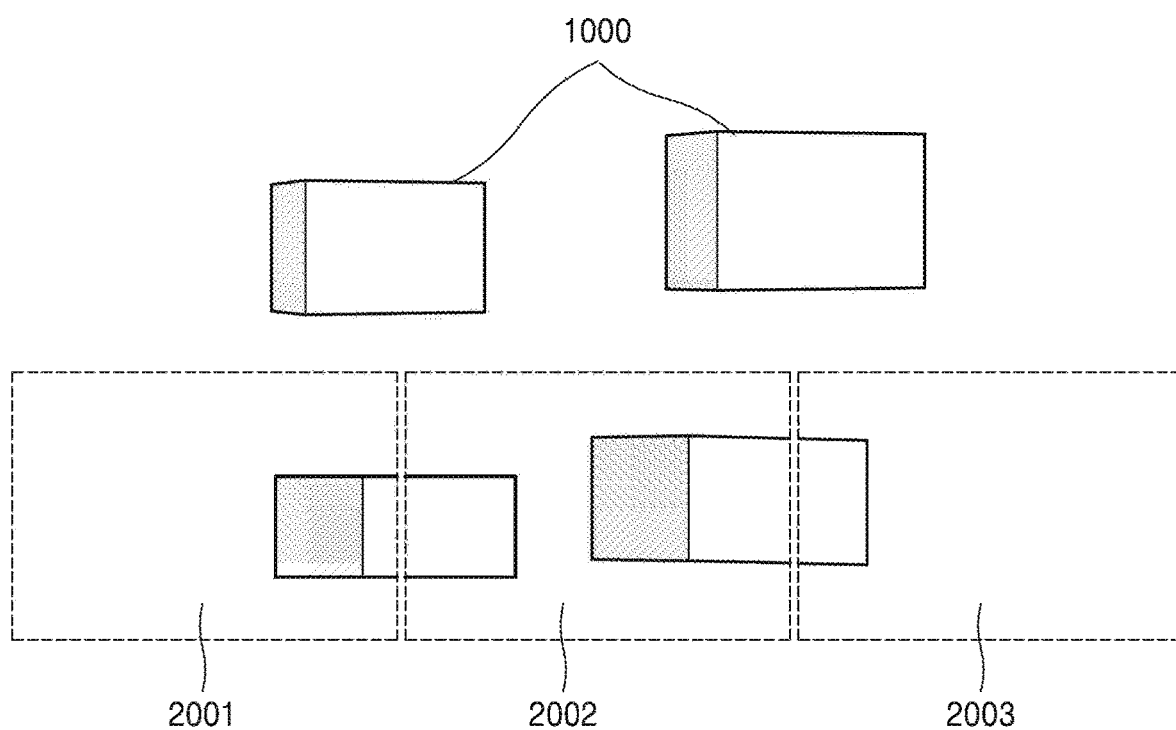
FIG. 26 is a diagram illustrating display of an object by a display device, according to an embodiment.
Figure 27:
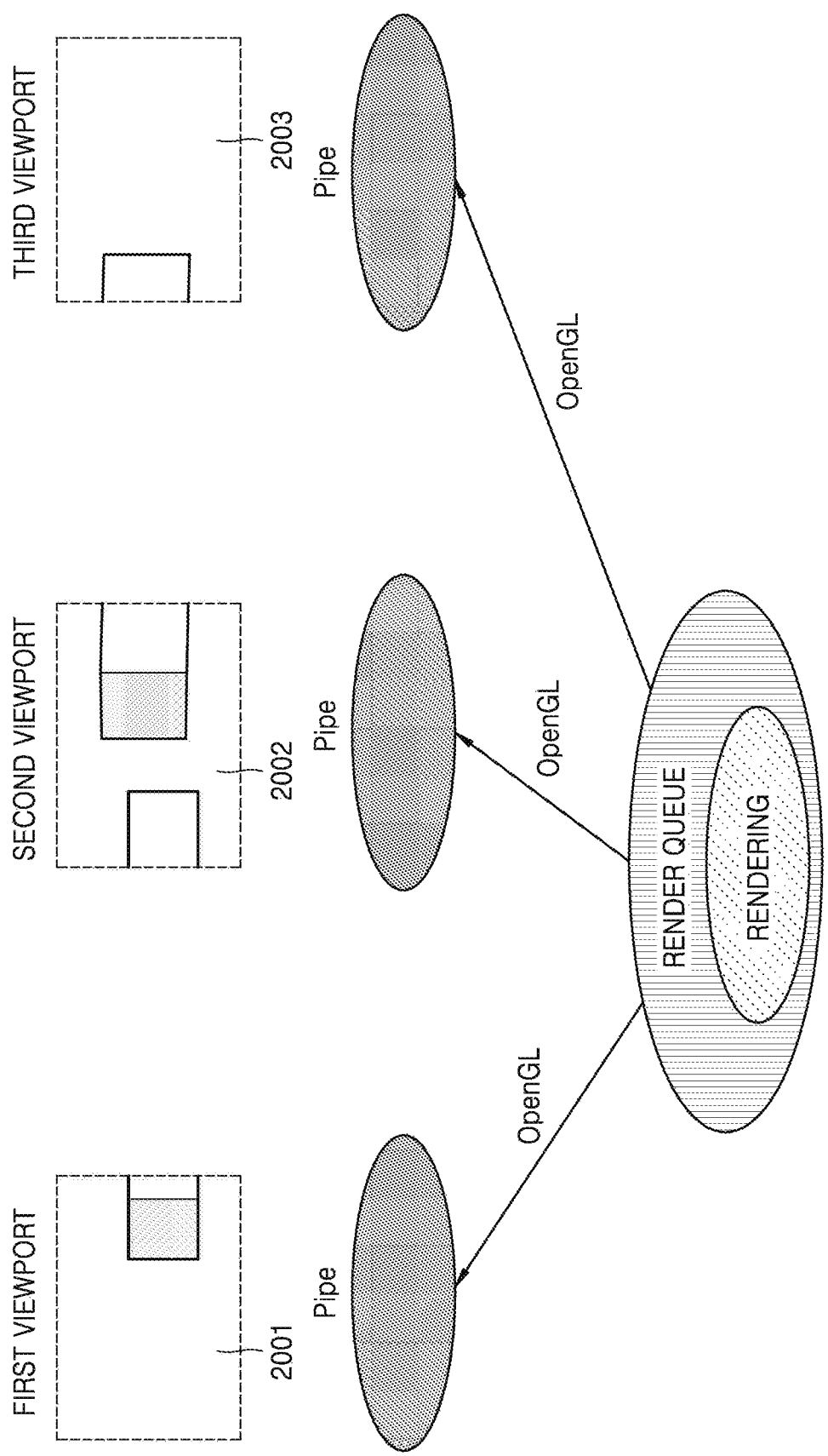
FIG. 27 is a diagram illustrating a display device for rendering a 3D image by using a pipe line, according to an embodiment.
Figure 28:
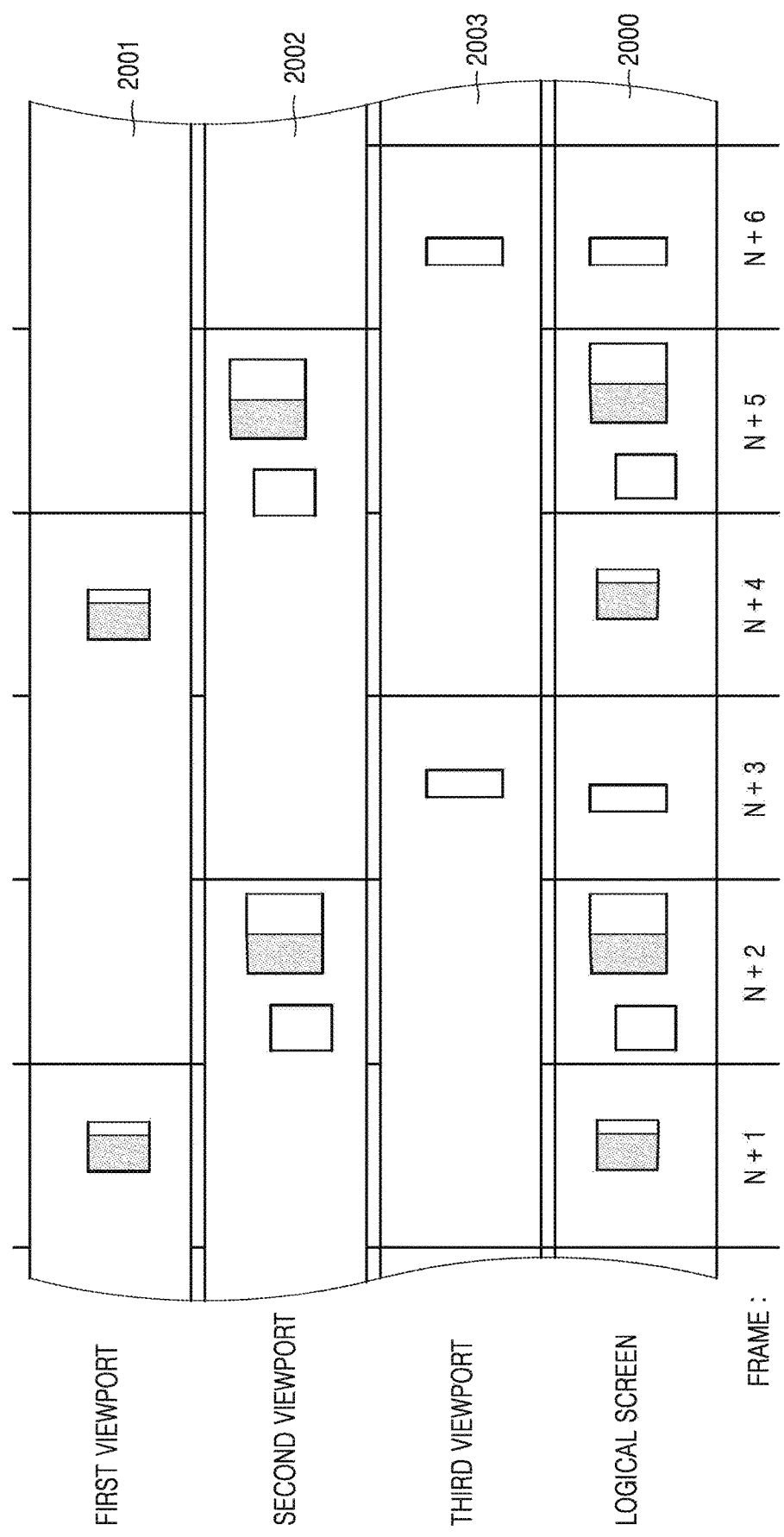
FIG. 28 is a diagram illustrating display of an image rendered based on a plurality of viewports on a logical screen, according to an embodiment.

FIGS. 26 to 28 are diagrams illustrating a process of displaying a 3D image on a display device, according to an embodiment. FIGS. 26 to 28 may represent a process of displaying a 3D image on a physical screen.

FIG. 26 is a diagram illustrating displaying an object 1000 on the display device 100, according to an embodiment. In FIG. 26, reference numerals 2001, 2002, and 2003 denote viewports. In FIG. 26, the display device 100 may have an undeformed shape and set the object 1000 to be displayed in each viewport.

The user may identify a portion of the object 1000 displayed in each of the first viewport 2001, the second viewport 2002, and the third viewport 2003 of the display device 100.

FIG. 27 is a diagram illustrating a display device for rendering a 3D image by using a pipe line, according to an embodiment.

The display device 100 may render a 3D image by using a plurality of pipe lines. The display device 100 may render a 3D image through an Open Graphics Library (OpenGL) pipe line. The display device 100 may render an image by multiplexing the output through a plurality of pipe lines.

The OpenGL (Open Graphics Library) is the 2D and 3D graphics standard API (Application Programming Interface) specification that may support cross-application programming between platforms between programming languages. The API may generate a complex 3D scene from simple geometric figures by using about 250 function calls. The OpenGL is used in fields such as CAD (Computer-Aided Design), virtual reality, information visualization, and flight simulation. Also, the OpenGL is widely used in the field of computer games. The display device 100 may generate basic figures such as points, lines, and polygons through the OpenGL, and may transform the same into a pixel format.

The display device 100 may output the rendered image on the screen through the render queue.

By using a plurality of pipe lines, the display device 100 may sequentially render the images displayed in the first viewport 2001, the second viewport 2002, and the third viewport 2003.

FIG. 28 is a diagram illustrating displaying an image rendered based on a plurality of viewports on a logical screen, according to an embodiment.

As illustrated in FIG. 28, the display device 100 may multiplex the first viewport 2001, the second viewport 2002, and the third viewport 2003 on a frame-by-frame basis.

The display device 100 may render the second frame after a certain time from the rendering of the first frame. The display device 100 may render the third frame after a certain time from the rendering of the second frame.

The display device 100 may render an image displayed on a logical screen, by merging the rendered frames in a plurality of viewports.

The display device 100 may display an image on a physical screen based on the current shape of the display device 100, that is, the deformation state of the display device 100.

By merging the images rendered by a plurality of viewports with time, the display device 100 may display an image on the logical screen and finally display an image on the physical screen. Through this process, the display device 100 may effectively display a 3D image.

Figure 29:
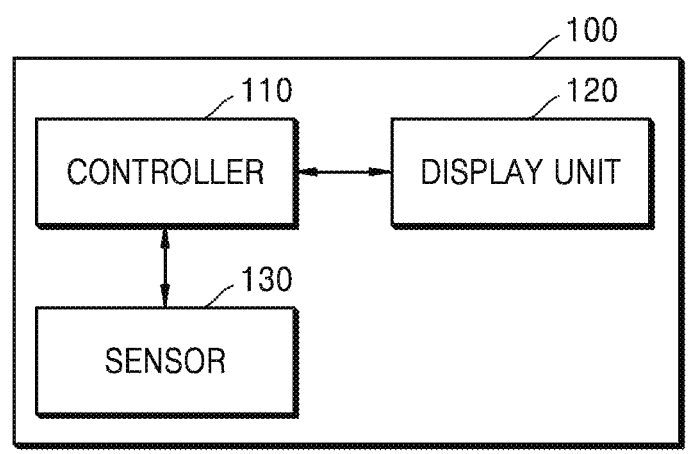
FIGS. 29 and 30 are functional block diagrams illustrating configurations of a display device, according to an embodiment.
Figure 30:
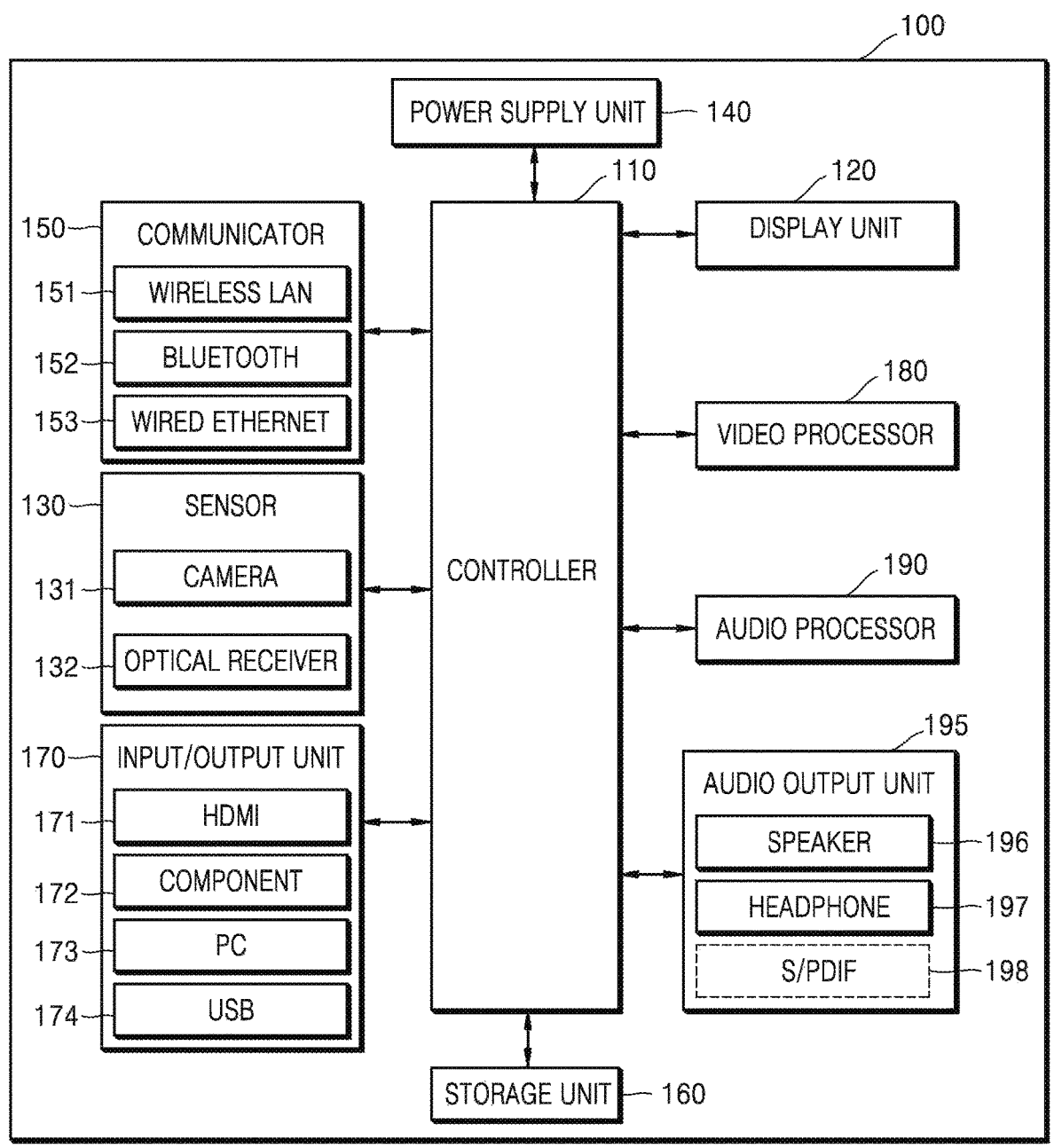

FIGS. 29 and 30 are functional block diagrams illustrating a configuration of a display device, according to an embodiment.

As illustrated in FIG. 29, the display device 100 may include a controller 110, a display unit 120, and a sensor 130. However, not all of the components illustrated in FIG. 29 are necessary components of the display device 100. The display device 100 may be implemented by more components than the components illustrated in FIG. 29, or may be implemented by less components than the components illustrated in FIG. 29.

For example, as illustrated in FIG. 30, the display device 100 according to some embodiments may further include a power supply unit 140, a communicator 150, a storage unit 160, an input/output unit 170, a video processor 180, an audio processor 190, and an audio output unit 195, in addition to the controller 110, the display unit 120, and the sensor 130.

The display unit 120 may generate a driving signal by converting an image signal, a data signal, an OSD (On-Screen Display) signal, or a control signal processed by the controller 110. The display unit 120 may be implemented as a PDP (Plasma Display Panel), an LCD, an OLED, or a flexible display, and may also be implemented as a 3D display. Also, the display unit 120 may be configured as a touch screen to be used as an input device in addition to an output device.

According to an embodiment, the display unit 120 may display a rendered 3D image. Also, the display unit 120 may display the user visible region 10 set according to the relative position of the user. Also, the display unit 120 may display an image to be displayed according to the shape, size, and position of the visible region.

For example, when the size of the visible region 10 changes from 70% to 100% of the entire screen region, an image of a 30% enlarged size with respect to the same image may be displayed in the visible region 10.

The display unit 120 may include at least one screen. A plurality of screens included in the display unit 120 may be connected at predetermined angles. According to an embodiment, the number of screens that may be included in the display unit 120 is not limited.

The display unit 120 may be deformed in shape. According to an embodiment, when the display unit 120 is a flexible display, the layout of the screen provided by the flexible display unit 120 may change dynamically as the unfolding angle of the flexible display unit 120 changes.

The controller 110 may sense the deformation degree of the display device 100 and detect the current shape thereof. The controller 110 may sense the deformation range of the display unit 120 while the display device 100 is deformed. For example, since a foldable display is deformed into the shape conformable to a foldable device, the deformation degree of the foldable device may have the same meaning as the deformation degree of the foldable display.

Also, the controller 110 may sense the shape conversion of the display device 100. For example, the controller 110 may sense the unfolding curvature, the unfolding angle, the bending curvature, and the rolling degree of the display device 100.

Also, the controller 110 may detect the number of polygons for constructing a 3D screen on the screen of the deformed display device 100. More particularly, the controller 110 may detect information about the 3D configuration of the screen of the display unit 120 according to the type, design, and screen deformation parameter of the display device 100. The controller 110 may calculate the number and direction of polygons for displaying a 3D image based on the detected 3D configuration.

The controller 110 may be a hardware configuration implemented by at least one processor such as a central processing unit (CPU) or an application processor (AP), and may control an overall operation of the display device 100.

The controller 110 may determine a visible region in the entire screen region according to the current shape of the display device 100 and the relative position of the user. Also, the controller 110 may render an image according to the set visible region.

Herein, the polygon may refer to a polygon that is a basic unit used to represent an object in the 3D graphic, and a plurality of polygons may be collected to form a character or a 3D object. Since the number of polygons that may be processed in real time during a rendering process for conversion into a 3D image is limited, it may be important to control the number of polygons within a range that does not exceed the hardware performance.

Also, the controller 110 may control the display unit 120 and the sensor 130 to control the function of the display device 100.

The sensor 130 may sense the relative position of the user with respect to the display device 100. More particularly, the sensor 130 may capture an image of the user to detect the position of the user.

Referring to FIG. 30, the sensor 130 may include a camera 131 and an optical receiver 132.

The camera 131 may capture an image of the user within the camera recognition range. Also, the camera 131 may receive an image corresponding to the motion of the user including the gesture within the camera recognition range. For example, the recognition range of the camera 131 may have a distance of about 0.1 m to about 5 m from the camera 131 to the user. The user's motion may include, for example, a motion of a user's portion or a user's body portion such as a user's face, look, hand, fist, or finger. Under the control of the controller 110, the camera 131 may convert the received image into an electrical signal and output the electrical signal to the controller 110.

According to an embodiment, in order for the controller 110 to identify the pupil of the user viewing the display device 100, the camera 131 may capture an image of the user's face including the user's pupil and output the captured face image to the controller 110.

Also, the camera 131 may include a plurality of camera modules. The controller 110 may activate at least one of the plurality of cameras included in the camera 131 based on the current shape of the display device 100.

The controller 110 may control the attribute of the visible region determined by the display device 100 by using the received image including the user's pupil or the image including the gesture.

Also, the controller 110 may determine the number of polygons by considering the attribute of the visible region, the relative position of the user, the eye position of the user, the gesture of the user, the eye direction of the user, and the like.

Also, the controller 110 may determine the number of polygons based on the attribute of the changed visible region and the state of the hardware.

The controller 110 may render a 3D image by using the determined polygons. The controller 110 may render the 3D image by using a different number of polygons according to the change of the visible region or the change of the hardware state.

The camera 131 may include a lens (not illustrated) and an image sensor (not illustrated). The camera 131 may support an optical zoom or a digital zoom by using a plurality of lenses and image processing. The recognition range of the camera 131 may be set variously according to the camera angle and the peripheral environmental conditions. When the camera 131 includes a plurality of cameras, it may receive a 3D still image or a 3D motion by using the plurality of cameras.

The camera 131 may be implemented as an integrated or separate type with respect to the display device 100. A separate device (not illustrated) including the separate camera 131 may be electrically connected with the display device 100 through the communicator 150 or the input/output unit 170.

The power supply unit 140 may supply power from the external power source to the internal components of the display device 100 under the control of the controller 110. Also, the power supply unit 140 may supply the power, which is output from one or more batteries (not illustrated) located in the display device 100, to the internal components under the control of the controller 110.

The optical receiver 132 may receive an optical signal corresponding to a user input (e.g., touch, press, touch gesture, voice, or motion) on the display device 100. The control signal may be extracted from the received optical signal under the control of the controller 110.

The communicator 150 may connect the display device 100 with an external device (e.g., an audio device) under the control of the controller 110. The controller 110 may transmit/receive contents to/from the external device connected through the communicator 150, download an application from the external device, or perform Web browsing. The communicator 150 may include any one of wireless LAN (Local Area Network) 151, Bluetooth 152, and wired Ethernet 153 corresponding to the structure and performance of the display device 100. Also, the communicator 150 may include any combination of the wireless LAN 151, the Bluetooth 152, and the wired Ethernet 153. The communicator 150 may receive an image control signal from the external device under the control of the controller 110. The control signal may be implemented as a Bluetooth type, an RF (Radio Frequency) signal type, or a Wi-Fi (Wireless Fidelity) type.

The communicator 150 may further include other short-range communications (e.g., NFC (Near Field Communication; not illustrated) and BLE (Bluetooth Low Energy; not illustrated)) in addition to Bluetooth.

The storage unit 160 may include an image receiving module; a display deformation sensing module; a volume control module; a communication control module; a voice recognition module; a motion recognition module; an optical receiver module; a display control module; an audio control module; an external input control module; a power control module; a power control module of an external device wirelessly (e.g., Bluetooth) connected; a voice database (DB); or a motion DB (not illustrated). The DB and modules (not illustrated) of the storage unit 160 may be implemented as a software type to perform, in the display device 100, an image reception control function, a volume control function, a communication control function, a voice recognition function, a motion recognition function, an optical receiver function, a display control function, an audio control function, an external input control function, a power control function, or a power control function of the external device connected by wireless (e.g., Bluetooth). The controller 110 may perform each function by using the software stored in the storage unit 160.

The input/output unit 170 may receive, for example, a video (e.g., moving image), an audio (e.g., voice and music), and additional information (e.g., EPG (Electronic Program Guide)) from outside the display device 100 under the control of the controller 110. The input/output unit 170 may include any one of an HDMI (High-Definition Multimedia Interface) port 171, a component jack 172, a PC port 173, and a USB (Universal Serial Bus) port 174. The input/output unit 170 may include any combination of the HDMI port 171, the component jack 172, the PC port 173, and the USB port 174.

Those of ordinary skill in the art will easily understand that the operation and configuration of the input/output unit 170 may be implemented variously according to embodiments.

The video processor 180 may perform processing on video data rendered by the display device 100. The video processor 180 may perform various image processing on the video data, such as decoding, scaling, noise filtering, frame rate conversion, and resolution conversion.

The audio processor 190 may perform processing on audio data. The audio processor 190 may perform various processing such as decoding, amplification, and noise filtering on the audio data. Meanwhile, the audio processor 190 may include a plurality of audio processing modules for processing the audios corresponding to a plurality of images.

The audio output unit 195 may output the audio included in the image signal rendered under the control of the controller 110. The audio output unit 195 may output the audio (e.g., voice and sound) input through the input/output unit 170 or the communicator 150. Also, the audio output unit 195 may output the audio stored in the storage unit 160 under the control of the controller 110. The audio output unit 195 may include at least one of a speaker 196, a headphone output port 197, and an S/PDIF (Sony/Philips Digital Interface) output port 198. The audio output unit 195 may include a combination of the speaker 196, the headphone output port 197, and the S/PDIF output port 198.

Each embodiment of the present disclosure may also be implemented in the form of a computer-readable recording medium including computer-executable instructions such as program modules executed by a computer. The computer-readable recording medium may be any available medium accessible by a computer and may include all of volatile or non-volatile mediums and removable or non-removable mediums. Also, the computer-readable recording medium may include all of computer storage mediums and communication mediums. The computer storage mediums may include all of volatile or non-volatile mediums and removable or non-removable mediums that are implemented by any method or technology to store information such as computer-readable instructions, data structures, program modules, or other data. For example, the communication mediums may include any information transmission medium and may include other transmission mechanisms or other data of modulated data signals such as carriers, computer-readable instructions, data structures, or program modules.

The foregoing is illustrative of embodiments of the present disclosure and is not to be construed as limiting thereof. Although the embodiments have been described above, those of ordinary skill in the art will readily understand that various modifications may be made therein without materially departing from the spirits or features of the present disclosure. Therefore, it is to be understood that the embodiments described above should be considered in a descriptive sense only and not for purposes of limitation. For example, elements described as being combined may also be implemented in a distributed manner, and elements described as being distributed may also be implemented in a combined manner.

Therefore, the scope of the present disclosure is defined not by the detailed description of the embodiments but by the following claims, and all changes or modifications derived from the meaning and scope of the following claims and equivalent concepts thereof should be construed as being included in the scope of the present disclosure.

The invention claimed is:

1. A method of a deformable display device, the method comprising:
    determining a current shape of the deformable display device;
    capturing a first image of a first user of the deformable display device;
    based on the first image of the first user, detecting a relative position of the first user with respect to the deformable display device;
    based on the current shape of the deformable display device and the relative position of the first user, determining a first visible screen region among an entire screen region of the deformable display device; and
    displaying an image in the first visible screen region,
    wherein the image comprises a three-dimensional (3D) image, and
    wherein the method further comprises rendering the 3D image according to an attribute of the first visible screen region.

2. The method of claim 1, wherein the attribute of the first visible screen region comprises at least one of a size of the first visible screen region, a position of the first visible screen region, and a shape of the first visible screen region.

3. The method of claim 1, further comprising deactivating a screen region other than the first visible screen region among the entire screen region.

4. The method of claim 1, further comprising changing a color of a background screen displayed in the first visible screen region among the entire screen region.

5. The method of claim 1,
    wherein the capturing of the first image comprises capturing at least a portion of a body of the first user, the portion including a pupil of the first user,
    wherein the detecting of the relative position of the first user comprises determining an eye position of the first user based on the first image including the pupil of the first user, and
    wherein the determining of the first visible screen region is further based on the eye position of the first user.

6. The method of claim 5, further comprising:
    changing the first visible screen region as the eye position of the first user changes; and
    displaying the image in the changed first visible screen region.

7. The method of claim 6, further comprising, based on an attribute of the changed first visible screen region, rendering the image to be displayed.

8. The method of claim 6, further comprising, based on an eye direction of the first user deviating from the entire screen region, stopping the changing of the first visible screen region.

9. The method of claim 1, further comprising:
capturing a second image of a second user of the deformable display device;
based on the second image of the second user, detecting a relative position of the second user with respect to the deformable display device;
based on the detected relative position of the second user and the current shape of the deformable display device, determining a second visible screen region among the entire screen region of the deformable display device; and
displaying a third image in the second visible screen region.

10. The method of claim 5, wherein the determining of the first visible screen region is further based on at least one of the eye position of the first user, a distance between the deformable display device and the first user, a gesture of the first user included in the first image, or an eye direction of the first user.

11. The method of claim 1,
wherein the deformable display device comprises a plurality of cameras, and
wherein the capturing of the first image of the first user comprises activating at least one of the plurality of cameras based on the current shape of the deformable display device.

12. The method of claim 1, further comprising:
sensing that the current shape of the deformable display device is deformed;
changing the first visible screen region based on a deformed shape as the current shape of the deformable display device is deformed; and
displaying the image in the changed first visible screen region.

13. The method of claim 1,
wherein the deformable display device comprises a plurality of screens,
wherein at least one screen of the plurality of screens is selected according to the current shape of the deformable display device, and
wherein the first visible screen region is determined among an entire region of the selected at least one screen.

14. The method of claim 9, wherein the second visible screen region does not overlap the first visible screen region among the entire screen region of the deformable display device.

15. The method of claim 9, wherein the third image displayed in the second visible screen region is different from the image displayed in the first visible screen region.

16. A computer-readable recording medium having recorded thereon a program that, when executed by a computer, performs the method of claim 1.

17. A deformable display device comprising:
a sensor configured to capture a user image of a user of the deformable display device;
a processor configured to:
determine a current shape of the deformable display device,
based on the user image of the user, detect a relative position of the user with respect to the deformable display device, and
based on the current shape of the deformable display device and the relative position of the user, determine a visible screen region among an entire screen region of the deformable display device; and
a display configured to display an image the visible screen region,
wherein the image comprises a three-dimensional (3D) image, and
wherein the processor is further configured to render the 3D image according to an attribute of the visible screen region.

18. The display device of claim 17,
wherein an attribute of the visible screen region comprises at least one of a size of the visible screen region, a position of the visible screen region, or a shape of the visible screen region.

* * * * *